US011874743B2

United States Patent
Hu et al.

(10) Patent No.: US 11,874,743 B2
(45) Date of Patent: Jan. 16, 2024

(54) METHOD FOR HANDLING TRUSTED EXECUTION ENVIRONMENT OPERATING SYSTEM CRASH AND ELECTRONIC DEVICE

(71) Applicant: HUAWEI TECHNOLOGIES CO., LTD., Guangdong (CN)

(72) Inventors: Xiameng Hu, Ottawa (CA); Ning Jia, Beijing (CN); Yu Li, Beijing (CN); Nan Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/866,196

(22) Filed: Jul. 15, 2022

(65) Prior Publication Data
US 2022/0350707 A1 Nov. 3, 2022

Related U.S. Application Data

(63) Continuation of application No. PCT/CN2020/115116, filed on Sep. 14, 2020.

(30) Foreign Application Priority Data

Jan. 19, 2020 (CN) .......................... 202010060572.4

(51) Int. Cl.
G06F 11/07 (2006.01)
G06F 11/14 (2006.01)
G06F 21/57 (2013.01)

(52) U.S. Cl.
CPC ........ G06F 11/1438 (2013.01); G06F 11/142 (2013.01); G06F 21/57 (2013.01)

(58) Field of Classification Search
CPC .... G06F 11/1438; G06F 11/142; G06F 21/57; G06F 11/1441; G06F 21/53
See application file for complete search history.

(56) References Cited

U.S. PATENT DOCUMENTS 9,977,914 B1 * 5/2018 Paczkowski ........ G06F 21/6218

FOREIGN PATENT DOCUMENTS

| CN | 103826162 A | 5/2014 |
|---|---|---|
| CN | 105138930 A | 12/2015 |

(Continued)

OTHER PUBLICATIONS

Zhan Pengyi et al., "Application of fuzz testing technology in security evaluation of trusted execution environment", Year:2017, total:5pages.

*Primary Examiner* — Matthew M Kim
*Assistant Examiner* — Kyle Emanuele
(74) *Attorney, Agent, or Firm* — WOMBLE BOND DICKINSON (US) LLP

(57) ABSTRACT

A method for handling a trusted execution environment operating system crash is provided. The method includes: when it is detected, in a running process of a security service, that a TEE OS crashes, an electronic device stores a hardware status parameter of a TEE and a security context of an REE that are obtained when the TEE OS crashes, and suspends the security service; the electronic device restarts the TEE OS; the electronic device sets, based on the stored hardware status parameter of the TEE, a hardware status parameter of the TEE obtained after the TEE OS is restarted; the electronic device sets, based on the stored security context of the REE, a security context of the REE obtained after the TEE OS is restarted and a context of the TEE obtained after the TEE OS is restarted; and the electronic device restores the security service.

20 Claims, 26 Drawing Sheets

(56) References Cited

FOREIGN PATENT DOCUMENTS

| CN | 106547618 | A | 3/2017 |
|---|---|---|---|
| CN | 106845285 | A | 6/2017 |
| CN | 109558211 | A | 4/2019 |
| CN | 109787943 | A | 5/2019 |
| CN | 110134545 | A | 8/2019 |
| CN | 110348252 | A | 10/2019 |
| WO | 2016204892 | A1 | 12/2016 |

* cited by examiner

METHOD FOR HANDLING TRUSTED EXECUTION ENVIRONMENT OPERATING SYSTEM CRASH AND ELECTRONIC DEVICE

CROSS-REFERENCE TO RELATED APPLICATIONS

This application is a continuation of International Application No. PCT/CN2020/115116, filed on Sep. 14, 2020, which claims priority to Chinese Patent Application No. 202010060572.4, filed on Jan. 19, 2020. The disclosures of the aforementioned applications are hereby incorporated by reference in their entireties.

TECHNICAL FIELD

This application relates to the technical field of terminals, and in particular, to a method for handling a trusted execution environment operating system crash and an electronic device.

BACKGROUND

An electronic device (for example, a mobile phone or a tablet computer) based on an ARM TrustZone includes a rich execution environment (REE) and a trusted execution environment (TEE). The REE is also referred to as a common execution environment, and includes a rich execution environment operating system (REE OS) and a client application (CA) that run on a general purpose processor. The TEE is also referred to as a secure execution environment, and a trusted execution environment operating system (TEE OS) may be run in the TEE to provide trusted security services (for example, a fingerprint matching service, a password verification service, and a face matching service) for the CA. These security services may be run in the TEE OS in the form of trusted applications (TA).

When an unrecoverable fault occurs on a TEE side, the TEE OS crashes. Consequently, an abnormality, for example, system jam or security service interruption (for example, an unlock failure or a payment failure), often occurs on an electronic device. In this case, the entire electronic device is forcibly restarted to restore to a normal use state. It takes a long time to restart the entire electronic device, and a user cannot use the electronic device during restarting of the electronic device, resulting in poor user experience.

SUMMARY

This application provides a method for handling a trusted execution environment operating system crash and an electronic device, so that when an unrecoverable fault occurs on a TEE side, an entire electronic device can be prevented from being restarted, thereby reducing a total restarting time, and improving user experience.

To achieve the foregoing objectives, this application uses the following technical solutions.

According to a first aspect, this application provides a method for handling a trusted execution environment operating system crash. The method is applied to an electronic device including a trusted execution environment TEE and a rich execution environment REE, where a trusted execution environment operating system TEE OS and a security service are run in the TEE. The method may include: when it is detected, in a running process of a security service, that the TEE OS crashes, the electronic device stores a hardware status parameter of the TEE and a security context of the REE that are obtained when the TEE OS crashes, and suspends the security service; the electronic device restarts the TEE OS; the electronic device sets, based on the stored hardware status parameter of the TEE, a hardware status parameter of the TEE obtained after the TEE OS is restarted; the electronic device sets, based on the stored security context of the REE, a security context of the REE obtained after the TEE OS is restarted and a context of the TEE obtained after the TEE OS is restarted; and the electronic device restores the security service.

The hardware status parameter of the TEE may include data in a register in the TEE. In this way, if the TEE OS crashes, the hardware status parameter of the electronic device is stored. Then, after the TEE OS is restarted, a hardware status may be restored quickly based on the stored hardware status parameter. This facilitates quick restoration of the security service in the TEE. The hardware status parameter of the TEE may also be referred to as a hardware status parameter of the TEE OS.

The context of the TEE may include a registered agent (agent), a session (session) in which a connection has been established, a registered security service, and the like that are included in the TEE OS when the TEE OS crashes. Specifically, before invoking a related module in the TEE to provide the security service, the REE sends, to the TEE, a request for security service registration including instruction cache registration, agent registration, secure memory registration, and the like. The TEE processes the request, generates an agent, and establishes a session connection, to complete registration of the corresponding security service. In addition, the TEE subsequently provides the security service for the REE by using the connection, and a context generated in this process is a security context.

The security context of the REE may include an agent that has been registered with the TEE when the TEE OS crashes, a session in which a connection with the TEE has been established when the TEE OS crashes, a security service that has been registered with the REE when the TEE OS crashes, and the like.

In other words, a status related to a security service in the electronic device may be referred to as a security context. The TEE is used to provide a security service for the REE, and a context of the TEE is a security context. The context of the TEE in this specification may also be understood as a security context of the TEE.

After the hardware status parameter and the security context are reset, the TEE OS has a capability of continuing to provide a security service for an application in the REE, and the electronic device can restore the security service. In other words, after the TEE OS is restored, the security service is run based on the foregoing newly set hardware status parameter and security context.

In this way, when the TEE OS crashes, the TEE OS may be restarted separately to restore the security service. In this way, the entire electronic device is not forcibly restarted, and a total restarting time is reduced. In addition, the hardware status parameter of the TEE obtained after the TEE OS is restarted may be set based on the hardware status parameter of the TEE stored before the TEE OS is restarted. The security context of the REE obtained after the TEE OS is restarted and the context of the TEE obtained after the TEE OS is restarted may be set based on the security context of the REE stored before the TEE OS is restarted, to further ensure quick restoration of the security service.

In an embodiment, a rich execution environment operating system REE OS is run in the REE; and the method further includes: After suspending the security service, the electronic device notifies, by using the REE OS, an application corresponding to the security service that the security service is unavailable.

In some embodiments, the application corresponding to the security service is deployed in the REE OS, and the application calls the security service.

In an embodiment, the method further includes: After suspending the security service, the electronic device suspends, by using the REE OS, receiving of a security service request sent by any application in the REE.

In this way, a case in which a security service processing error still occurs and user experience is affected because the REE OS receives a security service request sent by an application and sends a corresponding security service request to the TEE OS again during restarting of the TEE OS after the TEE OS crashes.

In an embodiment, the method further includes: After suspending the security service, the electronic device indicates, by using the REE OS, the application corresponding to the security service to exit the security service; and after restoring the security service, the electronic device indicates, by using the REE OS, the application corresponding to the security service to restart the security service.

In this way, the electronic device exits the security service. This can avoid the following case: After the TEE OS is restarted, because the REE OS is not restarted, the REE OS stores partial context information, and consequently the first security service request fails.

In an embodiment, the security service includes any one or more of a fingerprint matching service, a password verification service, and a face matching service.

In an embodiment, the hardware status parameter of the TEE includes data in a register in the TEE.

For example, the register may be a sec region register, and is configured to store a base address of a memory area allocated to the security service. A value in the sec region register is stored when the TEE OS crashes. After the TEE OS is restarted according to the method provided in this embodiment of this application, a memory location before the TEE OS crashes may be quickly determined directly based on the value in the register.

In an embodiment, the security context of the REE includes registration information of the security service.

In other words, the security service is provided on the TEE side; and before an application on an REE side uses the security service, the security service usually needs to be registered in the REE, and the registration information becomes a part of the security context of the REE.

According to a second aspect, this application provides a method for handling a trusted execution environment operating system crash. The method is applied to an electronic device including a trusted execution environment TEE and a rich execution environment REE, where the TEE provides a security service for the REE, the TEE includes a trusted execution environment operating system TEE OS, and the REE includes a rich execution environment operating system REE OS. The method includes: The REE OS receives a first notification in a process in which the security service is called in the REE, where the first notification indicates that the TEE OS has crashed; the REE OS stores a security context of the REE, suspends the security service, and sends a second notification to the TEE OS to indicate to restart the TEE OS; the REE OS receives a third notification, where the third notification is a notification that is sent by the TEE OS to the REE OS after the TEE OS sets a hardware status parameter of the TEE obtained after the TEE OS is restarted; the REE OS sets, based on the stored security context of the REE, a security context of the REE obtained after the TEE OS is restarted; the REE OS receives a fourth notification, where the fourth notification is a notification that is sent by the TEE OS to the REE OS after the TEE OS sets a context of the TEE obtained after the TEE OS is restarted; and the REE OS restores the security service.

In some embodiments, that the REE OS stores a security context of the REE may include, for example, that the REE OS stores a current security context of the REE. The "current security context of the REE" is a security context of the REE when the storage action is performed. In some other embodiments, a security context prior to a specific time length or another security context set based on a system may be stored.

In an embodiment, in response to the third notification, the REE OS sets, based on the stored security context of the REE, the security context of the REE obtained after the TEE OS is restarted. In response to the fourth notification, the REE OS restores the security service.

In some embodiments, the third notification may also be considered to be used to indicate that the TEE OS has set the hardware status parameter for the TEE obtained after the TEE OS is restarted. The fourth notification may also be considered as to be used to indicate that the TEE OS has set the context for the TEE obtained after the TEE OS is restarted. Specific forms of the foregoing notifications are not limited in this application.

In an embodiment, after the REE OS suspends the security service, the method further includes: The REE OS sends a fifth notification to an application corresponding to the security service to notify that the security service is unavailable.

In an embodiment, after the REE OS suspends the security service, the method further includes: The REE OS suspends receiving of a security service request sent by any application in the REE.

In some embodiments, that the REE OS suspends the security service may be considered that the REE OS sends, to the application corresponding to the security service, a notification indicating that the security service is unavailable, to notify the application corresponding to the security service that the security service is not provided in a current time period. Alternatively, that the REE OS suspends the security service may be considered that the REE OS suspends receiving of a security service request sent by any application in the REE. Alternatively, that the REE OS suspends the security service may be considered that the REE OS receives a security service request sent by an application, but does not process the request, that is, no longer sends a security service request to the TEE side; or the like.

In an embodiment, after the REE OS suspends the security service, the method further includes: The REE OS sends a sixth notification to the application corresponding to the security service, to exit the security service. After the REE OS restores the security service, the method further includes: The REE OS sends a seventh notification to the application corresponding to the security service, to restart the security service.

In an embodiment, the security service includes any one or more of a fingerprint matching service, a password verification service, and a face matching service.

In an embodiment, the security context of the REE includes registration information of the security service.

According to a third aspect, this application provides a method for handling a trusted execution environment operating system crash. The method is applied to an electronic device including a trusted execution environment TEE and a rich execution environment REE, where the TEE provides a security service for the REE, the TEE includes a trusted execution environment operating system TEE OS, and the REE includes a rich execution environment operating system REE OS. The method includes: In a process in which the TEE provides the security service, if the TEE OS crashes, the TEE OS stores a hardware status parameter of the TEE, and sends a first notification to the REE OS, where the first notification is used to indicate the REE OS to suspend the security service; after the TEE OS receives a second notification, the TEE OS is restarted, where the second notification is a notification that is sent by the REE OS to the TEE OS after the REE OS suspends the security service; the TEE OS sets, based on the stored hardware status parameter of the TEE, a hardware status parameter of the TEE obtained after the TEE OS is restarted, and sends a third notification to the REE OS, where the third notification is used to indicate the REE OS to set a security context of the REE obtained after the TEE OS is restarted; and the TEE OS sets, based on the security context of the REE obtained after the TEE OS is restarted, a context of the TEE obtained after the TEE OS is restarted, and sends a fourth notification to the REE OS, where the fourth notification is used to indicate the REE OS to restore the security service.

That the TEE OS stores a hardware status parameter of the TEE may include, for example, that the TEE OS stores a current hardware status parameter of the TEE. The "current hardware status parameter" is a hardware status parameter when the storage action is performed. In some other embodiments, a hardware status parameter prior to a specific time length or another hardware status parameter set based on a system may be stored.

In some embodiments, the second notification may also be considered to be used to indicate that the REE OS has suspended the security service. A specific form of the foregoing notification is not limited in this application.

In an embodiment, the security service includes any one or more of a fingerprint matching service, a password verification service, and a face matching service.

In an embodiment, the hardware status parameter of the TEE includes data in a register in the TEE.

According to a fourth aspect, this application provides a computer system, including a trusted execution environment TEE and a rich execution environment REE, where the TEE provides a security service for the REE, the TEE includes a trusted execution environment operating system TEE OS, a first storage unit, and a restarting unit, and the REE includes a rich execution environment operating system REE OS and a second storage unit, where the TEE OS is configured to run the security service; the first storage unit is configured to: in a process in which the TEE OS runs the security service, if the TEE OS crashes, store a hardware status parameter of the TEE; the second storage unit is configured to store a security context of the REE; the REE OS is further configured to suspend calling of the security service; the restarting unit is configured to restart the TEE OS; the TEE OS is further configured to set, based on the stored hardware status parameter of the TEE, a hardware status parameter of the TEE obtained after the TEE OS is restarted; the REE OS is further configured to set, based on the stored security context of the REE, a security context of the REE obtained after the TEE OS is restarted; the TEE OS is further configured to set, based on the stored security context of the REE, a context of the TEE obtained after the TEE OS is restarted; and the REE OS is further configured to restore calling of the security service.

In an embodiment, the REE OS, further configured to: after suspending calling of the security service, send, to an application corresponding to the security service, a notification indicating that the security service is unavailable.

In an embodiment, the apparatus further includes the REE OS, further configured to: after suspending calling of the security service, suspend receiving of a security service request sent by any application in the REE.

In an embodiment, the REE OS is further configured to: after suspending calling of the security service, indicate the application corresponding to the security service to exit the security service; and the REE OS is further configured to: after restoring calling of the security service, indicate the application corresponding to the security service to restart the security service.

In an embodiment, the security service includes any one or more of a fingerprint matching service, a password verification service, and a face matching service.

In an embodiment, the hardware status parameter of the TEE includes data in a register in the TEE.

In an embodiment, the security context of the REE includes registration information of the security service.

According to a fifth aspect, this application provides an apparatus for handling a trusted execution environment operating system crash, including a processing unit, a receiving unit, a storage unit, and a sending unit. The processing unit is configured to call a security service of a trusted execution environment TEE. The receiving unit is configured to receive a first notification in a process in which the processing unit calls the security service for the REE, where the first notification is used to notify that a trusted execution environment operating system TEE OS has crashed. The storage unit is configured to store a security context of a rich execution environment REE. The processing unit is further configured to suspend the security service. The sending unit is configured to send a second notification to the TEE OS, where the second notification is used to indicate to restart the TEE OS. The receiving unit is further configured to receive a third notification, where the third notification is a notification that is sent by the TEE OS to the REE OS after the TEE OS sets a hardware status parameter of the TEE obtained after the TEE OS is restarted. The processing unit is further configured to set, based on the stored security context of the REE, a security context of the REE obtained after the TEE OS is restarted. The receiving unit is further configured to receive a fourth notification, where the fourth notification is a notification that is sent by the TEE OS to the REE OS after the TEE OS sets a context of the TEE obtained after the TEE OS is restarted. The processing unit is further configured to restore calling of the security service.

The apparatus for handling a trusted execution environment operating system crash may be implemented by hardware, may be implemented by software, or may be implemented by hardware executing corresponding software. When implemented by software, the apparatus may be the REE OS.

In an embodiment, the sending unit is further configured to: after the processing unit suspends calling of the security service, send a fifth notification to an application corresponding to the security service to notify that the security service is unavailable.

In an embodiment, the receiving unit is further configured to: after the processing unit suspends calling of the security service, suspend receiving of a security service request sent by any application in the REE.

In an embodiment, the sending unit is further configured to: after the processing unit suspends calling of the security service, send a sixth notification to the application corresponding to the security service to exit the security service. The sending unit is further configured to: after the processing unit restores calling of the security service, send a seventh notification to the application corresponding to the security service to restart the security service.

In an embodiment, the security service includes any one or more of a fingerprint matching service, a password verification service, and a face matching service.

In an embodiment, the security context of the REE includes registration information of the security service.

According to a sixth aspect, this application provides an apparatus for handling a trusted execution environment operating system crash, including a processing unit, a storage unit, a sending unit, a receiving unit, and a restarting unit. The processing unit is configured to provide a security service. The storage unit is configured to: in a process in which the processing unit provides the security service, store a hardware status parameter of a TEE if the processing unit crashes. The sending unit is configured to send a first notification to a rich execution environment operating system REE OS, where the first notification is used to indicate the REE OS to suspend the security service. The receiving unit is configured to receive a second notification, where the second notification is a notification that is sent by the REE OS to a TEE OS after the REE OS suspends the security service. The restarting unit is configured to restart the processing unit. The processing unit is further configured to set, based on the stored hardware status parameter of the TEE, a hardware status parameter of the TEE obtained after the processing unit is restarted. The sending unit is further configured to send a third notification to the REE OS, where the third notification is used to indicate the REE OS to set a security context of an REE obtained after the processing unit is restarted. The processing unit is further configured to set, based on the security context of the REE obtained after the processing unit is restarted, a context of the TEE obtained after the processing unit is restarted. The sending unit is further configured to send a fourth notification to the REE OS, where the fourth notification is used to indicate the REE OS to restore the security service.

The apparatus for handling a trusted execution environment operating system crash may be implemented by hardware, may be implemented by software, or may be implemented by hardware executing corresponding software. When implemented by software, the apparatus may be the TEE OS.

In an embodiment, the security service includes any one or more of a fingerprint matching service, a password verification service, and a face matching service.

In an embodiment, the hardware status parameter of the TEE includes data in a register in the TEE.

According to a seventh aspect, this application provides an electronic device. The electronic device may include: one or more processors, where the one or more processors include a trusted execution environment TEE and a rich execution environment REE, the TEE provides a security service for the REE, the TEE includes a trusted execution environment operating system TEE OS, and the REE includes a rich execution environment operating system REE OS; a memory; and one or more computer programs. The one or more computer programs are stored in the memory, and the one or more computer programs include instructions. When the instructions are executed by the one or more processors, the electronic device is enabled to perform the method for handling a trusted execution environment operating system crash according to any one of the first aspect to the third aspect and the possible embodiments of the first aspect to the third aspect.

According to an eighth aspect, this application provides an electronic device. The electronic device has a function of implementing the method for handling a trusted execution environment operating system crash according to any one of the first aspect to the third aspect and the possible embodiments of the first aspect to the third aspect. The function may be implemented by hardware, or may be implemented by hardware executing corresponding software. The hardware or the software includes one or more modules corresponding to the function.

According to a ninth aspect, this application provides a computer-readable storage medium, including computer instructions. When the computer instructions are run on an electronic device, the electronic device is enabled to perform the method for handling a trusted execution environment operating system crash according to any one of the first aspect to the third aspect and the possible embodiments of the first aspect to the third aspect.

According to a tenth aspect, this application provides a computer program product. When the computer program product is run on an electronic device, the electronic device is enabled to perform the method for handling a trusted execution environment operating system crash according to any one of the first aspect to the third aspect and the possible embodiments of the first aspect to the third aspect.

According to an eleventh aspect, a circuit system is provided, where the circuit system includes a processing circuit, and the processing circuit is configured to perform the method for handling a trusted execution environment operating system crash according to any one of the first aspect to the third aspect and the possible embodiments of the first aspect to the third aspect.

According to a twelfth aspect, an embodiment of this application provides a chip system, including at least one processor and at least one interface circuit. The at least one interface circuit is configured to implement receiving and sending functions and send instructions to the at least one processor. When the at least one processor executes the instructions, the at least one processor performs the method for handling a trusted execution environment operating system crash according to any one of the first aspect to the third aspect and the possible embodiments of the first aspect to the third aspect.

DESCRIPTION OF EMBODIMENTS

With reference to the accompanying drawings, the following describes in detail a method for handling a trusted execution environment operating system crash and an electronic device that are provided in embodiments of this application.

Technical solutions provided in embodiments of this application are applicable to an electronic device having a TEE and an REE. When a TEE OS in the TEE crashes, the TEE OS may be restarted separately to avoid restarting of the entire electronic device (including restarting of the TEE OS and an REE OS), thereby reducing a total time required from a time point at which the TEE OS crashes to a time point at which the TEE OS is restarted to restore a security service, and improving experience of using the electronic device.

For example, the electronic device in embodiments of this application may be a mobile phone, a tablet computer (pad), a computer with wireless receiving and sending functions, a personal digital assistant (PDA), a smartwatch, a netbook, a wearable electronic device, an augmented reality (AR) device, a virtual reality (VR) device, a vehicle-mounted device, a wireless terminal in industrial control, a wireless terminal in self driving, a wireless terminal in a remote medical system, a wireless terminal in a smart grid, a wireless terminal in transportation safety, a wireless terminal in a smart city, a wireless terminal device in a smart home, or an artificial intelligence (AI) terminal.

Figure 1:
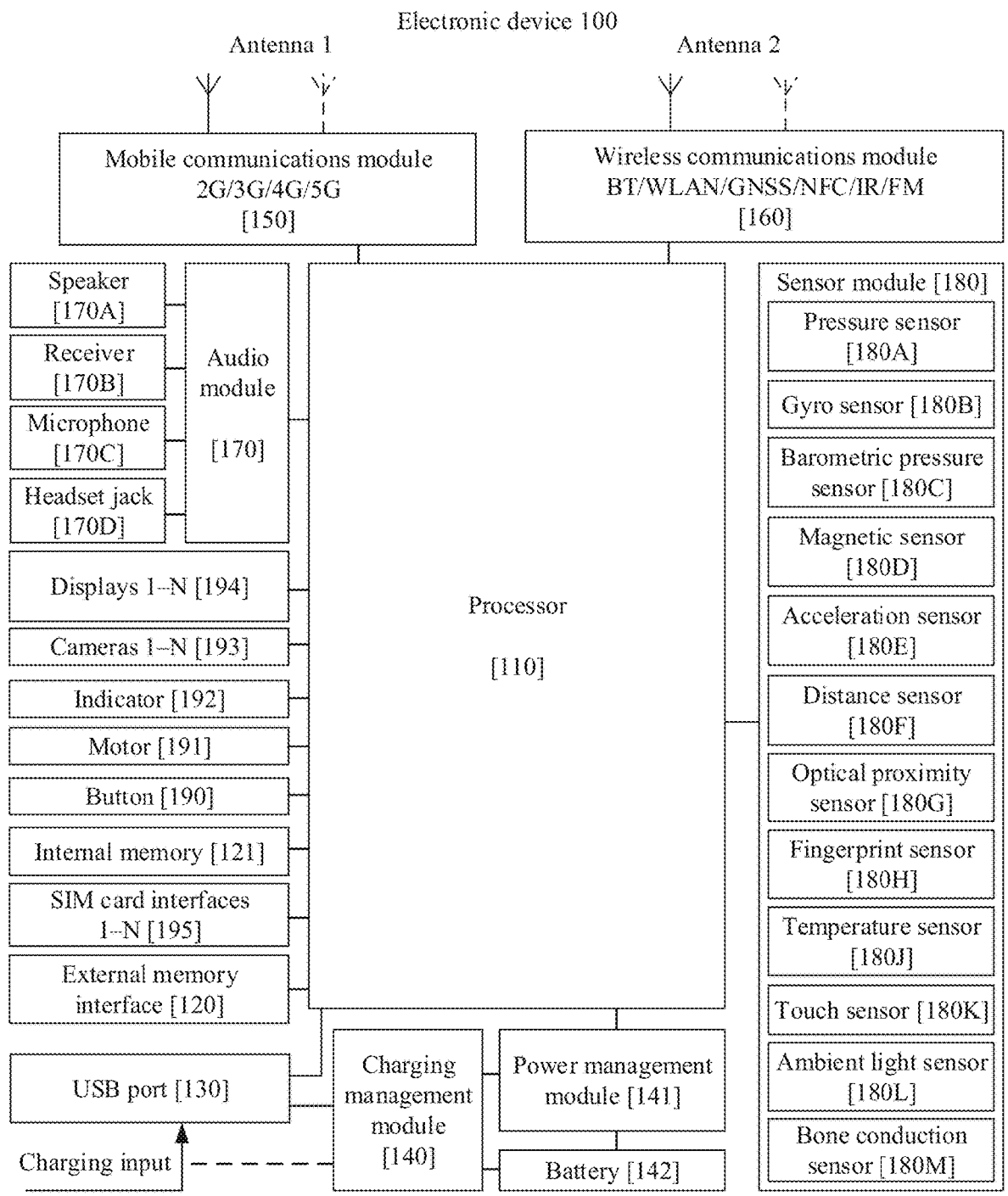
FIG. 1 is a schematic diagram of a structure of an electronic device according to an embodiment of this application.

For example, FIG. 1 is a schematic diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors. The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments of this application, a running environment of the processor 110 may include a TEE and an REE. A trusted application (TA) and a TEE OS are run in the TEE, and a CA and an REE OS are run in the REE. An REE side is responsible for receiving a security service request sent by a user to the CA and calling a security service on a TEE side according to the security service request. For example, the CA receives a fingerprint entered by the user, and sends a fingerprint template to the TEE side by using the REE OS; and matching the fingerprint of the user with the pre-stored fingerprint template is performed by using the security service in the TEE. The TEE returns a matching result to the CA by using the REE. If matching fails, a prompt "Fingerprint-based unlocking fails. Please enter a fingerprint again" is displayed to the user. If matching succeeds, user identity authentication succeeds, and related operations (such as payment and unlocking) may be performed.

When the TEE OS crashes, and the security service in the TEE is interrupted or stopped, the processor 110 may independently restart the TEE OS to restore the security service in the TEE. It should be noted that, the REE OS is not restarted in this embodiment of this application. This helps to reduce a time required from a time point at which the TEE OS crashes to a time point at which the security service on the TEE side is restored, thereby improving running efficiency of the electronic device.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be a mini USB port, a micro USB port, a USB Type-C port, or the like. The USB port 130 may be configured to connect to a charger for charging the electronic device 100, may be configured to transmit data between the electronic device 100 and a peripheral device, or may be configured to connect to a headset for playing audio through the headset. Alternatively, the port may be configured to connect to another electronic device, for example, an AR device.

It can be understood that an interface connection relationship between the modules in this embodiment of this application is merely an example for description, and does not constitute a limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from a charger. The charger may be a wireless charger or a wired charger. In some embodiments of wired charging, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 while charging the battery 142. The power management module 141 is configured to connect to the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transfer a processed electromagnetic wave to the modem processor for demodulation. The mobile communication module 150 may further amplify a signal modulated by the modem processor, and convert the signal to an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communication module 160 may be one or more devices that integrate at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data and an address book) created in a process of using the electronic device 100, and the like. In addition, the internal memory 121 may include a high-speed random access memory, or may include a nonvolatile memory, for example, at least one magnetic disk storage device, a flash memory, or a universal flash storage (UFS).

In some embodiments of this application, the internal memory 121 may be configured to store a TEE OS image and the like. The TEE OS image may be an original image, or may be a periodically stored TEE OS memory snapshot. When the TEE OS is restarted, the electronic device 100 may invoke the stored TEE OS image from the internal memory 121, to restore the TEE OS to a state before the crash, and repair an abnormality.

In some other embodiments of this application, the internal memory 121 may also include an area for storing data related to the security service in the TEE, and storage space corresponding to the area may also be referred to as a "secure memory".

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" or a "sound conducting device", is configured to convert a sound signal into an electrical signal. When making a call or sending voice information, a user may make a sound near the microphone 170C, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130 or a 3.5 mm open mobile terminal platform (OMTP) standard interface or a cellular telecommunication industry association (CTIA) of the USA standard interface.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

Figure 2:
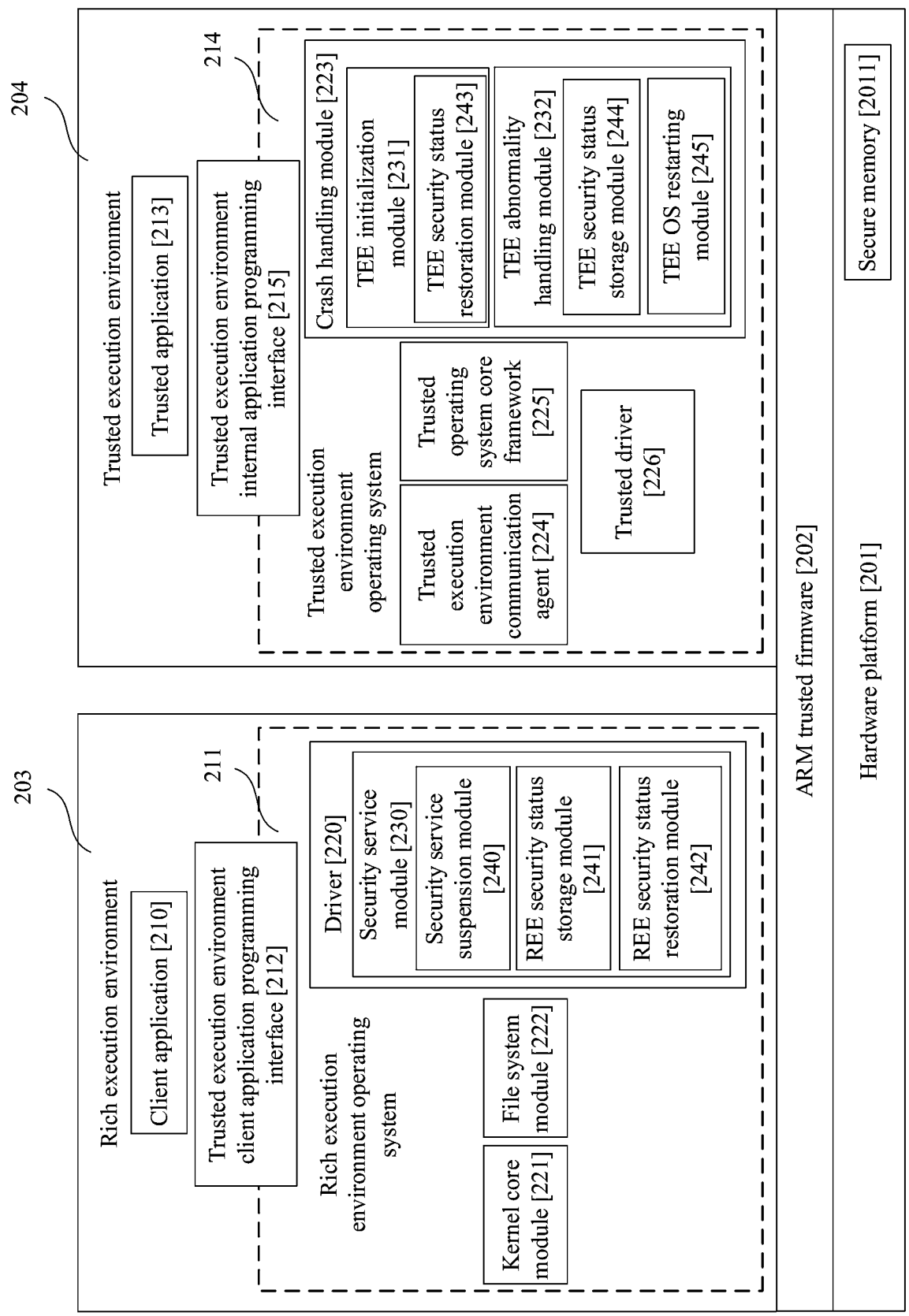
FIG. 2 is a schematic diagram of a structure of a TrustZone framework according to an embodiment of this application.

FIG. 2 is a schematic diagram of a structure of a TrustZone framework that may be included in an electronic device 100 according to an embodiment of this application.

For example, the electronic device 100 includes a hardware platform 201, ARM trusted firmware (arm trusted firmware, ATF) 202, and a rich execution environment (REE) 203 and a trusted execution environment (TEE) 204 that are based on the hardware platform 201 and the ARM trusted firmware 202.

The hardware platform 201 is configured to support running of the electronic device 100 and storage of a security hardware resource. The security hardware resource may include a secure memory 2011, a hardware key, a security keyboard, and the like.

In some embodiments of this application, the secure memory 2011 is configured to store a backed-up TEE OS image, and store security service—related data and the like.

The REE 203 is a common execution environment in the electronic device 100. A client application (CA) 210 and a rich execution environment operating system (REE OS) 211 may be run in the REE 203. The CA 210 includes an application that may provide a security service for a user. When a security service needs to be called, the REE OS 211 communicates with a trusted execution environment operating system (TEE OS) 214 through a trusted execution environment client application programming interface (API) 212, to request support of the security service.

The REE OS 211 includes a driver 220, configured to support data transfer between the system and a hardware device and support a security service-based interaction operation between the REE 203 and the TEE 204. For example, the REE OS 211 may include a security service module 230 (security service driver), a clock driver, and the like.

The security service module 230 may be configured to provide a security service for the CA 210 in the REE 203, and/or obtain a security service from the TEE 204 for the CA 210 in the REE 203. The security service module 230 may include a security service suspension module 240, an REE security status storage module 241, and an REE security status restoration module 242. The security service suspension module 240 is configured to: during restarting of the TEE OS 214, prevent the CA 210 in the REE 203 from sending a security service request to the REE OS 211. The REE security status storage module 241 is configured to: before the TEE OS 214 is restarted, store a security service-related parameter on an REE 203 side, for example, a security context. The REE security status restoration module 242 is configured to: after the TEE OS 214 is restarted, restore the security service-related parameter on the REE 203 side, for example, the security context. Specific functions of the modules and interactions between the modules are described in detail below.

It can be understood that, the security service suspension module 240, the REE security status storage module 241, and the REE security status restoration module 242 herein may be independent modules, or some of the modules may be combined. This is not limited in this embodiment of this application.

In an embodiment, the REE OS 211 may further include a kernel core module 221 and a file system module 222.

The kernel core module 221 is a kernel of the operating system, and is configured to provide core service support, including driving hardware and providing core functions required by various systems.

The file system module 222 is configured to provide a file-related service, for example, file access support. In the electronic device 100, data is stored in a peripheral device in the form of a file, and is transferred into a memory from the file system module 222 when needed. The file system module 222 is mainly configured to preserve, manage, and protect files, and improve system resource utilization.

The TEE 204 is a trusted execution environment in the electronic device 100, and may provide a security service for the REE 203 side. The TEE 204 is a secure area in which a trusted application (TA) 213 and the TEE OS 214 are run in an independent environment. This can ensure that confidentiality and integrity of code and data loaded in the TEE 204 are protected. The TEE OS 214 communicates with the REE OS 211 by calling a trusted execution environment internal application programming interface 215, to provide security service support.

The TEE OS 214 includes a crash handling module 223 that may be configured to deal with a problem that a security service cannot be provided for the REE 203 side because an abnormal crash occurs on a TEE 204 side. The crash handling module 223 includes a TEE initialization module 231 that may be configured to initialize the TEE 204 when an abnormality occurs in the TEE 204. The TEE initialization module 231 may include a TEE security status restoration module 243, configured to: after the TEE OS 214 is restarted, restore a security service-related parameter on the TEE 204 side, for example, a hardware state parameter and a context. The crash handling module 223 further includes a TEE abnormality handling module 232 that may be configured to handle an abnormality that occurs in the TEE 204. For example, the abnormality may include a crash abnormality that occurs in TEE OS 214. The TEE abnormality handling module 232 may include a TEE security status storage module 244 and a TEE OS restarting module 245. The TEE security status storage module 244 is configured to: before the TEE OS 214 is restarted, store the security service-related parameter on the TEE 204 side, for example, the hardware state parameter. The TEE OS restarting module 245 is configured to restart the TEE OS 214. Specific functions of the modules and interactions between the modules are described in detail below.

It can be understood that, the TEE security status restoration module 243, the TEE security status storage module 244, and the TEE OS restarting module 245 herein may be independent modules, or some modules in the modules may be combined. This is not limited in this embodiment of this application.

In an embodiment, the TEE OS 214 may further include a trusted execution environment communication agent 224, a trusted operating system core framework 225, and a trusted driver 226.

The trusted execution environment communication agent 224 is an agent (agent) configured to support a communication operation between the TEE and the REE.

The trusted operating system core framework 225 is configured to provide a core service in the TEE 204 and support the TEE OS 214, for example, perform memory, process, and thread management.

The trusted driver 226 is configured to provide a drive service for the TEE 204, for example, drive execution of a fingerprint matching security service.

It should be noted that, the structure described in this embodiment of this application does not constitute any specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

All technical solutions in the following embodiments may be implemented in the electronic device 100 having the hardware architecture shown in FIG. 1 and the TrustZone framework shown in FIG. 2.

Figure 3:
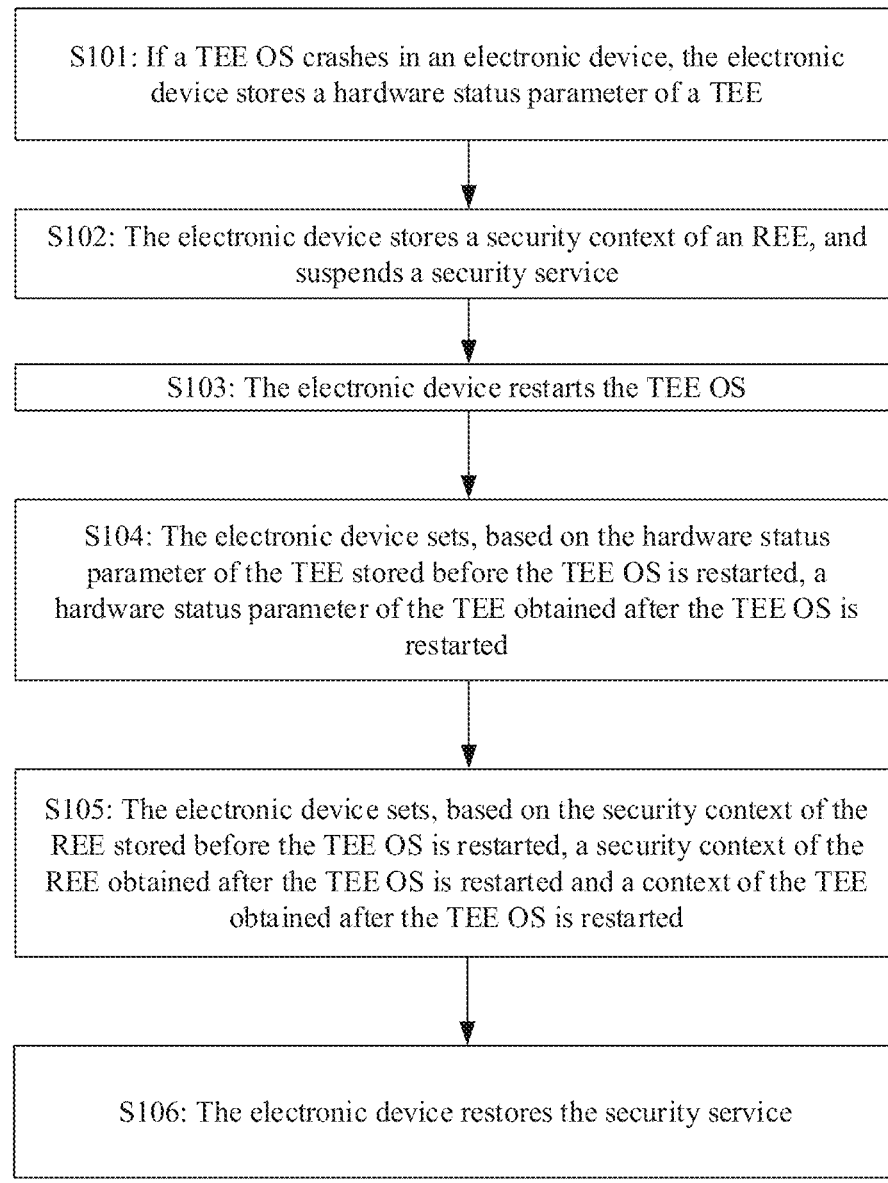
FIG. 3 is a schematic flowchart 1 of a method for handling a trusted execution environment operating system crash according to an embodiment of this application.

FIG. 3 is a schematic flowchart of a method for handling a trusted execution environment operating system crash according to an embodiment of this application. The method may include operation S101 to operation S106.

S101: If a TEE OS crashes in an electronic device, the electronic device stores a hardware status parameter of a TEE.

For example, in a process of running an application, when the application is related to a security service (for example, a user identity authentication service), the electronic device invokes a related module in the TEE by using an REE. In a process in which the REE invokes the related module in the TEE to provide the security service, if an unrepairable fault occurs in the TEE OS, the TEE OS crashes, and the security service is stopped or interrupted.

Causes leading to crashing of the TEE OS include but are not limited to: a third-party driver problem, a core service code bug (bug), and some hardware faults. For example, the electronic device is a mobile phone. A mobile phone vendor may integrate a fingerprint recognition module of another hardware vendor into a mobile phone. In this case, a TEE OS of the mobile phone needs to invoke the fingerprint recognition module by using third-party driver code. When the third-party driver code is abnormal, the mobile phone cannot repair the third-party driver code. As a result, the TEE OS may crash. Alternatively, if a hardware fault occurs in the fingerprint recognition module of the another hardware vendor, the TEE OS of the mobile phone cannot drive the fingerprint recognition module. As a result, the TEE OS may crash. For another example, a plurality of registers are used in a process in which the TEE OS provides a security service. If any one or more registers are faulty, the TEE OS may perform reading and writing abnormally. As a result, the TEE OS crashes.

In a specific implementation, if the TEE OS crashes, the TEE OS may first store the hardware status parameter of the TEE. The hardware status parameter of the TEE may include data in each register in the TEE. For example, the register is a sec region register, and is configured to store a base address of a memory area allocated to the security service. A value in the sec region register is stored when the TEE OS crashes. After the TEE OS is restarted according to the method provided in this embodiment of this application, a memory location before the TEE OS crashes may be quickly determined directly based on the value in the register. It can be understood that, in a process of running the security service, the TEE OS continuously reads values in related registers, and stores, in a corresponding register, data obtained through calculation. Therefore, the data in the register in the TEE may reflect a hardware running status of the TEE. Certainly, the hardware status parameter of the TEE may alternatively be another parameter that reflects a status of related hardware of the TEE. This is not limited in this embodiment of this application. That the TEE OS stores the hardware status parameter of the TEE may include, for example, that the TEE OS stores a current security context of the TEE. The "current security context of the TEE" is a hardware status parameter of the TEE when the storage action is performed. In some other embodiments, a hardware status parameter prior to a specific time length or another hardware status parameter set based on a system may be stored.

It should be noted that, if the TEE OS crashes, the hardware state parameter of the electronic device is stored. Then, after the TEE OS is restarted, a hardware status may be restored quickly based on the stored hardware status parameter. This facilitates quick restoration of the security service in the TEE, and improves user experience.

For example, in a process in which a user performs fingerprint-based payment by using Alipay, if the TEE OS crashes due to a failure in driving the fingerprint recognition module or another factor, a fingerprint-based payment related security service is interrupted. In this case, the electronic device may have performed a part of data reading and writing operations related to a fingerprint matching security service. In other words, values in at least some registers in the TEE change. Therefore, storage of a value in a register in the TEE helps to directly set, after the TEE OS is restarted and by using a stored value in the register in the TEE, a value in the register in the TEE obtained after the TEE OS is restarted, without performing related data reading and writing operations during restarting of the TEE OS. This helps to accelerate restoration of the fingerprint-based payment related security service in the TEE.

In some embodiments of this application, when it is determined that the TEE OS crashes, alternatively, whether hardware of the electronic device is faulty may be first determined, or specific hardware that is faulty may be determined. If it is determined that the hardware of the electronic device is not faulty, hardware status parameters may be directly stored. If it is determined that one piece or some pieces of hardware of the electronic device is faulty, a status parameter of another piece of hardware that is not faulty is stored. In some examples, a status parameter/status parameters of a piece or some pieces of faulty hardware may be stored as zero.

For example, one of 100 registers that need to be used to support a face matching security service is faulty. After the TEE OS crashes, when the hardware status parameter of the TEE is stored, a value in a register that is faulty is not stored or the value in the register is stored as zero. In this way, when the hardware status parameter in the TEE is subsequently reset, correctness of a set hardware status parameter is ensured.

S102: The electronic device stores a security context of an REE, and suspends a security service.

In some embodiments of this application, after the TEE OS crashes, a security service request sent from an REE side cannot be processed. The TEE OS sends a notification to an REE OS to notify that the TEE OS has crashed. After receiving the notification, the REE OS stores the security service-related data on the REE side.

In some examples, the REE OS suspends receiving of a new security service request sent by using an application, to prevent the REE OS from still becoming abnormal due to crash of the TEE OS after the REE OS receives the new security service request. In some other examples, the REE OS may not process a new security service request after receiving the new security service request, or may even directly discard the received new security service request. For example, an interface for receiving a security service request, for example, an invoke command interface (invoke command KPI), is set in the REE OS. A switch is set in the interface. When confirming that the TEE OS has crashed, the REE OS sets a check value of the interface to fail. In this way, receiving of the new security service request is suspended, or no processing is performed after the new security service request is received.

In an implementation, that the REE OS stores the security context of the REE may include, for example, that the REE OS stores a current security context of the REE. The "current security context of the REE" is a security context of the REE when the storage action is performed. In some other embodiments, a security context prior to a specific time length or another security context set based on a system may be stored.

The security context of the REE may include, for example, a status related to the security service such as registration information of the security service. The registration information of the security service may include an allocation result of a secure memory (a memory for storing data related to the security service), an instruction buffer address, a working agent that has been registered with the TEE currently, a session in which a connection with the TEE has been established currently, a security service that has been registered with the TEE, and the like. It can be understood that, before invoking a related module in the TEE to provide the security service, the REE first performs instruction cache registration, agent registration, secure memory registration, and the like with the TEE. When the TEE OS is restarted after the TEE OS crashes, a security service connection established between the REE and the TEE before the TEE OS crashes is ineffective. Therefore, the security context of the REE is stored herein to obtain the registration information of the security service. The REE may send a security service registration request to the TEE based on the registration information, to re-establish a connection and directly restore a related context of the TEE based to the stored security context of the REE.

The security service may include a service related to user identity authentication, for example, a fingerprint matching service, a password verification service, and a face matching service.

For example, when the user uses a fingerprint-based payment function of the Alipay application, the user needs to enter a fingerprint of the user. The TEE matches the acquired fingerprint of the user with a pre-stored fingerprint template. If the TEE OS crashes during the matching process, matching the acquired fingerprint of the user with the fingerprint template cannot be completed. The REE OS may suspend a security service related to fingerprint matching. In some examples, the REE OS may send, to the Alipay application, a notification indicating that the TEE OS crashes. In some other examples, if the Alipay application has not received, within a preset time period, a fingerprint matching result sent by the REE OS, it is determined that the current security service request fails or an abnormality occurs.

In some other embodiments of this application, the REE OS may send a notification to an application corresponding to the security service in the REE, to notify that the security service in the TEE is unavailable. In this case, after receiving the notification, the application suspends sending of a new security service request. For example, a list may be preset in the REE OS. The list is used to display a security service that is being run or waits to be run in security services that have been registered on the REE side. After the TEE OS crashes, a security service cannot continue to be provided. Therefore, the security service included in the list needs to be suspended. The security service included in the list may be obtained, and registration information of the security service may be obtained, and then information about an application corresponding to each security service is obtained based on the registration information. In this way, an application corresponding to the security service in the list may be determined based on the list. The REE OS may send, to the corresponding application, a notification indicating that the security service is unavailable. After receiving the notification, the application may automatically suspend sending of a new security service request.

S103: The electronic device restarts the TEE OS.

For example, the electronic device may reinitialize the TEE OS to a most original state based on a TEE OS image backed up in the secure memory. Alternatively, the electronic device periodically stores a TEE OS memory snapshot in a running process. In this case, the electronic device may reinitialize the TEE OS to a most recent correct state by using a memory snapshot stored at a most recent time point.

S104: The electronic device sets, based on the hardware status parameter of the TEE stored before the TEE OS is restarted, a hardware status parameter of the TEE obtained after the TEE OS is restarted.

For example, after the TEE OS is restarted, the security hardware status parameter of the TEE is first restored to support subsequent restoration of a software parameter of the TEE, for example, a context. The hardware status parameter of the TEE obtained after the TEE OS is restarted is set, based on the hardware state parameter of the TEE that is stored in operation S101 when the TEE OS crashes, to the hardware status parameter of the TEE before the TEE OS is restarted, to quickly restore a hardware status.

For example, in a process in which the user performs fingerprint-based payment by using Alipay, if the TEE OS crashes, the electronic device stores a value in each register in the TEE at this time. After the TEE OS is restarted, the electronic device may directly set, based on the stored value in the register in the TEE, a value in the register in the TEE obtained after the TEE OS is restarted. This helps to quickly restore the fingerprint-based payment related security service in the TEE.

S105: The electronic device sets, based on the security context of the REE stored before the TEE OS is restarted, a security context of the REE obtained after the TEE OS is restarted and a context of the TEE obtained after the TEE OS is restarted.

For example, after the TEE OS is restarted, the security context of the REE and the context of the TEE may be gradually restored. For example, the security context of the REE obtained after the TEE OS is restarted is gradually set based on the stored security context of the REE, and then operations related to the security service are gradually performed based on the set security context of the REE, to restore the context on a TEE side. For example, instruction cache registration, agent registration, and secure memory registration are completed, a session connection between the REE OS and an application is restored, and a security service process is restarted.

For example, the REE OS obtains registration information of a security service based on the stored security context of the REE, sends requests for registration of some or all of security services to the TEE OS based on the registration information of the security service, and the REE OS restores registration of the security services according to the registration requests. For example, instruction cache registration, agent registration, and secure memory registration are completed, a session connection between the TEE OS and the REE OS is restored, and a security service process is restarted. Then, the TEE OS continues to send a subsequent security service request until registration of the security services is completed. In this case, the security context of the REE and the context of the TEE are restored to states existing before the TEE OS crashes, so that the security services can be provided.

S106: The electronic device restores the security service.

For example, after the security context of the REE obtained after the TEE OS is restarted and the context of the TEE obtained after the TEE OS is restarted are set, the TEE OS has a capability of continuing to provide the security service for an application in the REE, and the TEE OS may send a notification to the REE to restore the security service suspended in operation S102.

It should be noted that, for some security services that can be performed only through multi-process cooperative control, in a process of restoring the security services, the REE OS needs to restore the security services according to a predetermined sequence.

For example, for a face matching security service, multi-process cooperative control is required. For example, cooperative control of a first process and a second process is required. The first process is executed first, and then the second process is executed. In a process in which the electronic device restores the face matching security service, the first process needs to be restored first, and then the second process needs to be restored. Before the second process is restored, whether the first process is restored is determined. If the first process is restored, the second process starts to be restored. If the first process is not restored, the second process is restored after the first process is restored; or the first process is restored first, and then the first process indicates the second process to start to be restored. This is not limited in this embodiment of this application.

It can be learned from the above that, when the TEE OS in the TEE crashes, the TEE OS may be restarted separately to avoid restarting of the entire electronic device (including restarting of the TEE OS and the REE OS) caused in a conventional technology, thereby reducing a total time required from a time point at which the TEE OS crashes to a time point at which the TEE OS is restarted to restore the security service, and improving experience of using the electronic device.

In addition, the REE OS is not restarted, and memory space data when the TEE OS crashes may be stored on the REE side, so that abnormal memory space data on the TEE side is not lost. After the TEE OS is restarted, comparison and analysis may be performed based on the stored abnormal memory space data on the TEE side and newly created memory space data on the TEE side, to quickly analyze a cause of the crash of the TEE OS, thereby reducing maintenance costs.

The following provides a description with reference to a specific application scenario.

Scenario 1: A scenario in which a TEE OS crashes in a process in which an electronic device provides a security service.

Figure 4A:
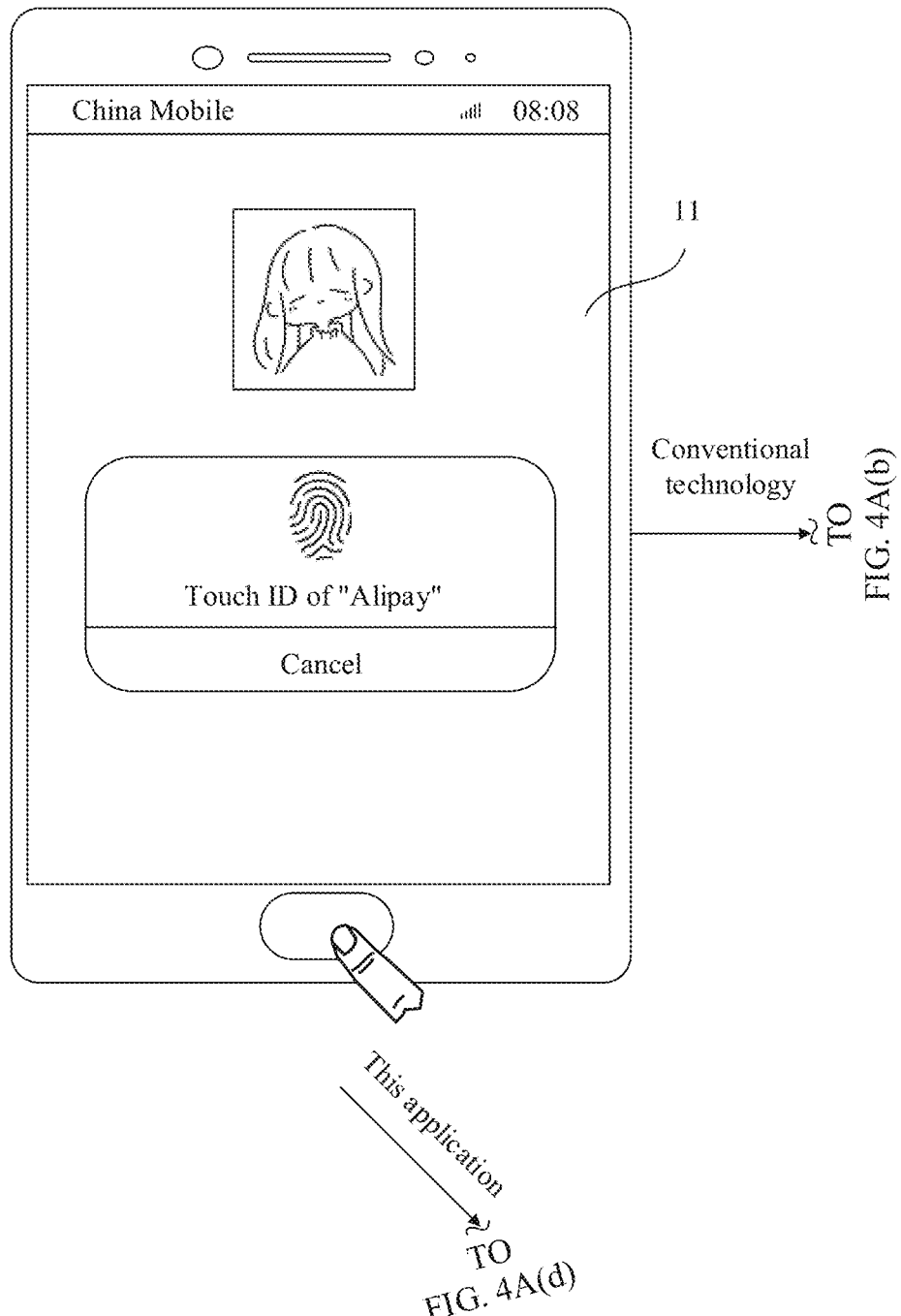
FIG. 4A(a), FIG. 4A(b), FIG. 4A(c), and FIG. 4A(d) are a schematic diagram 1 of an application scenario of a method for handling a trusted execution environment operating system crash according to an embodiment of this application.
Figure 4A:
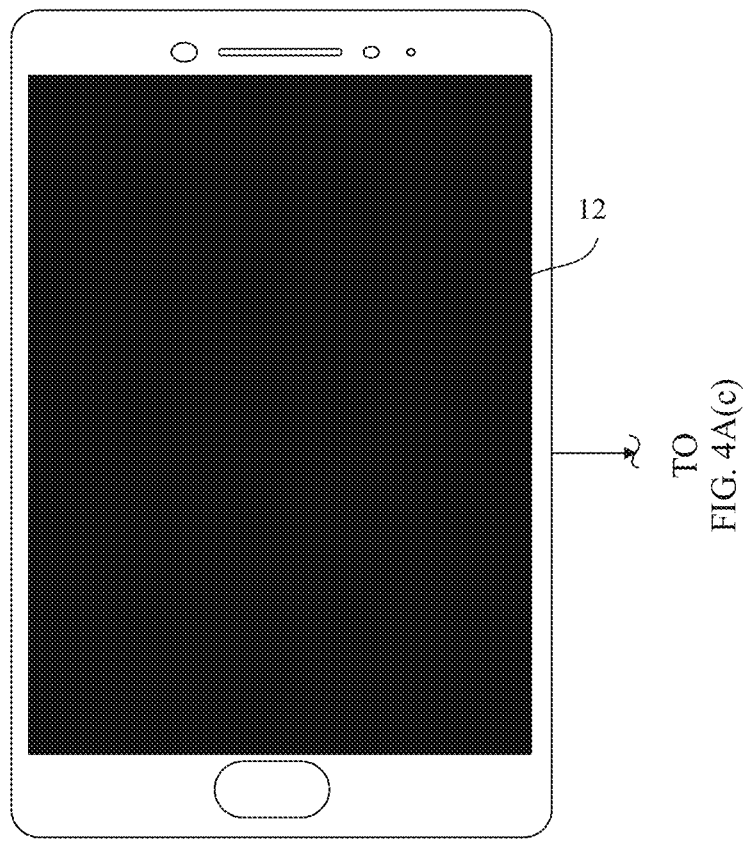
Figure 4A:
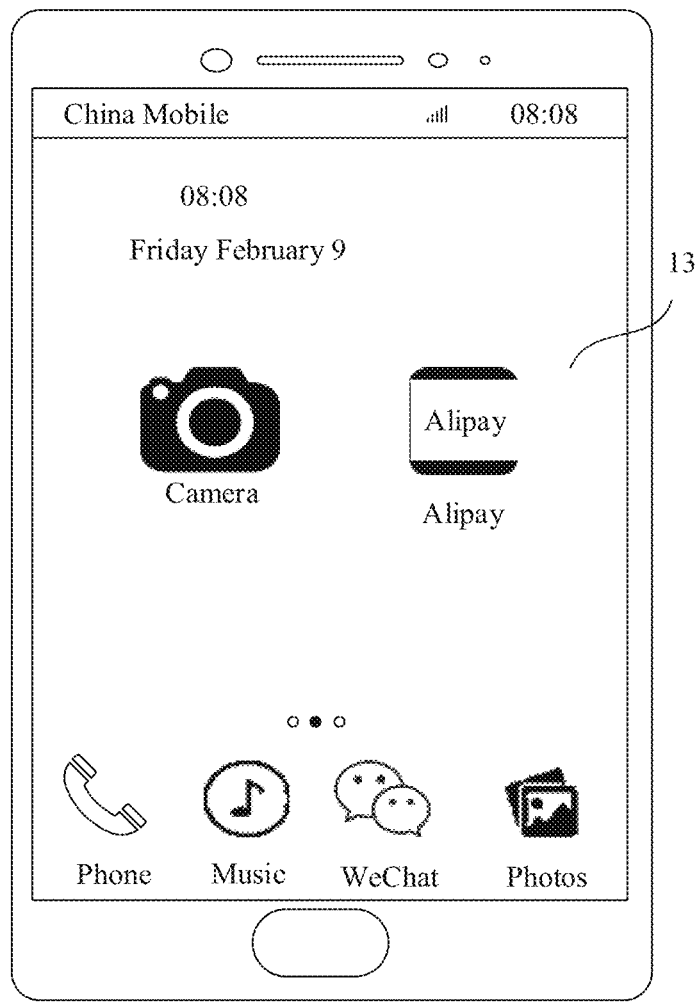
Figure 4A:
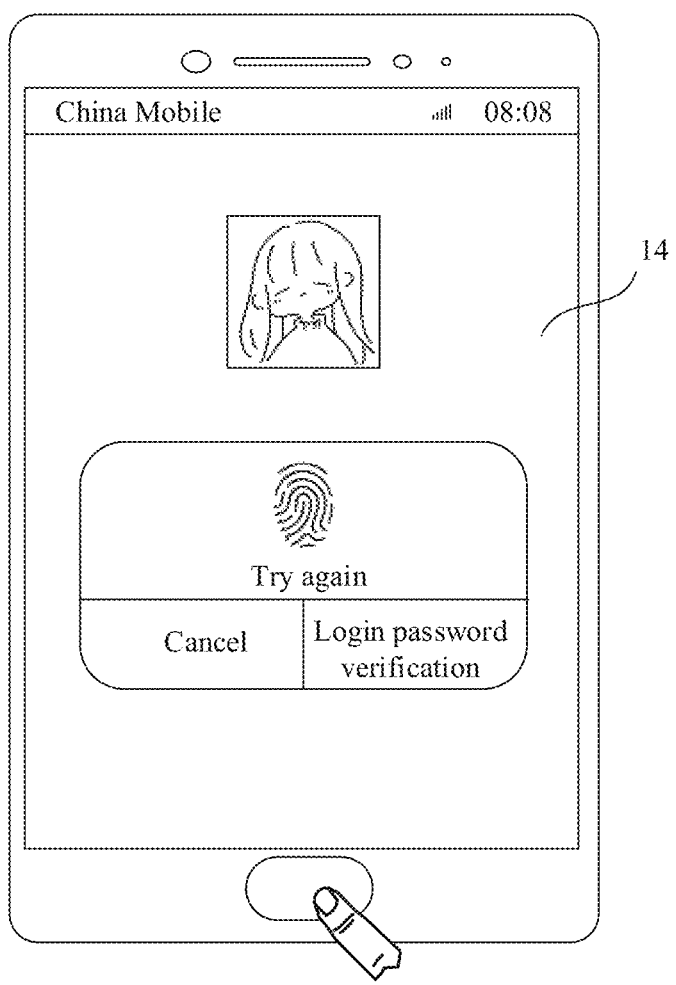

For example, a description is provided by using an example in which a mobile phone is used as the electronic device. FIG. 4A(a) shows an interface 11. The interface 11 is an interface that is of an Alipay application of the mobile phone and that provides a fingerprint-based payment function for a user. In this case, the mobile phone acquires a fingerprint entered by the user. Then, an REE OS of the mobile phone invokes a security service module in a TEE to perform operations such as matching the fingerprint entered by the user with a fingerprint record.

In a conventional technology, if the TEE OS crashes in a fingerprint matching process, the mobile phone automatically shuts off and restarts to restore the security service. For example, after the TEE OS crashes, the mobile phone displays a black screen (shutdown) interface 12 shown in FIG. 4A(b). During restarting of the mobile phone, the mobile phone cannot provide a service for the user. After the mobile phone restarts, a home screen interface 13 shown in FIG. 4A(c) is displayed. In this case, the user can reuse a fingerprint recognition function of Alipay only by continuing to perform a plurality of operations on the home screen interface such as tapping an Alipay application icon and enabling a fingerprint-based payment function. It can be learned that, it takes a long time for performing a process of restoring the security service in the conventional technology.

In this embodiment of this application, if the TEE OS crashes in a fingerprint matching process, current fingerprint matching fails. In this case, the mobile phone may display an interface 14 shown in FIG. 4A(d), that is, an interface for indicating the user to enter the fingerprint again. The mobile phone restarts the TEE OS separately. In a process of restarting the TEE OS, the REE OS is not restarted. Therefore, in the process of restarting the TEE OS, the mobile phone does not display a black screen, and may maintain the interface 14 shown in FIG. 4A(d). After the TEE OS is restarted and the security service is restored, in response to a fingerprint entering operation performed by the user on the interface 14, the mobile phone may match the fingerprint entered by the user with a fingerprint record. It can be learned that, by using the method for handling a trusted execution environment operating system crash provided in this embodiment of this application, a time required from a time point at which the TEE OS crashes to a time point at which the security service is restored can be effectively reduced.

Scenario 2: A scenario in which a TEE OS crashes in a process in which an electronic device provides both a security service and another service.

Figure 4B:
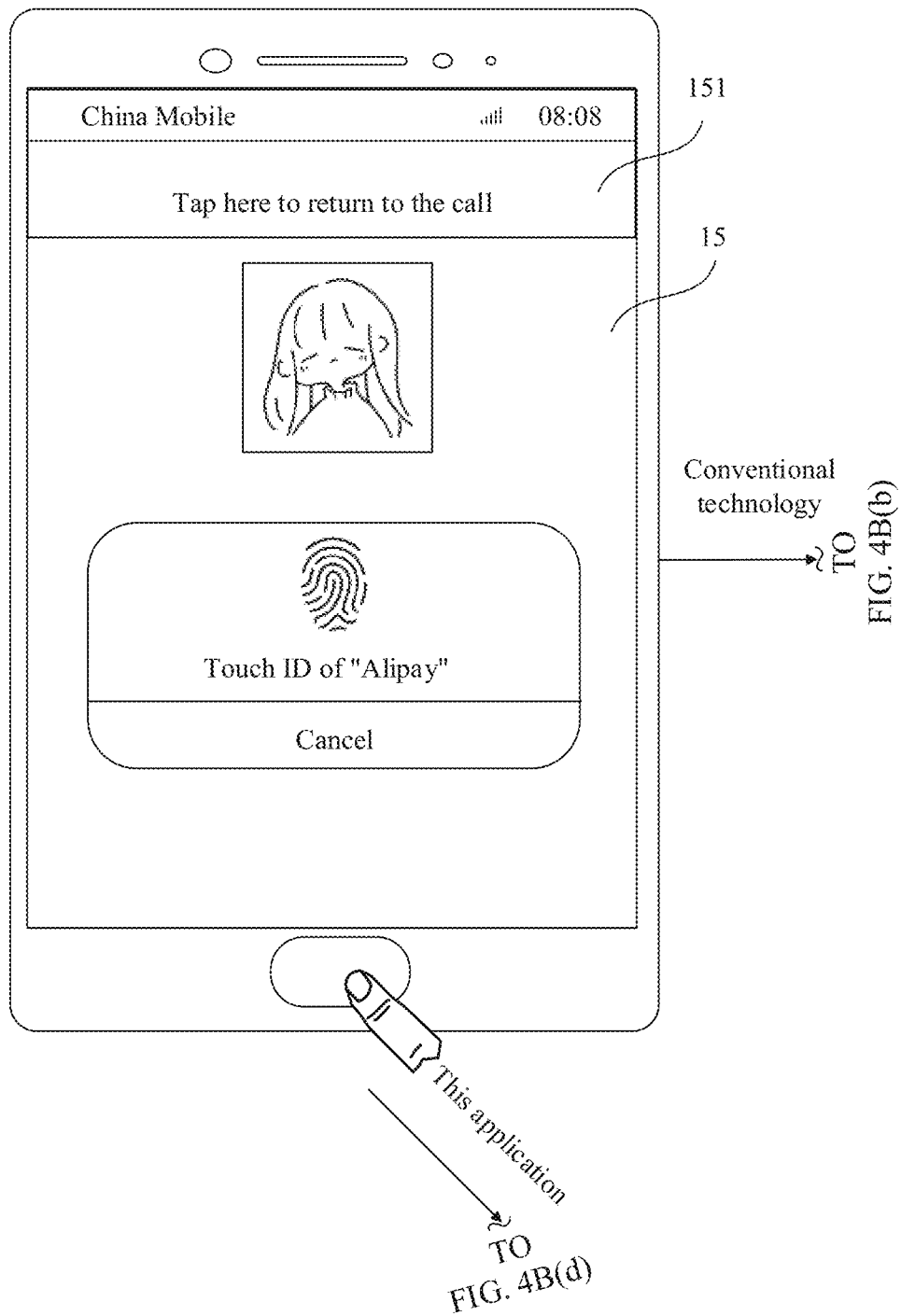
FIG. 4B(a), FIG. 4B(b), FIG. 4B(c), and FIG. 4B(d) are a schematic diagram 2 of an application scenario of a method for handling a trusted execution environment operating system crash according to an embodiment of this application.
Figure 4B:
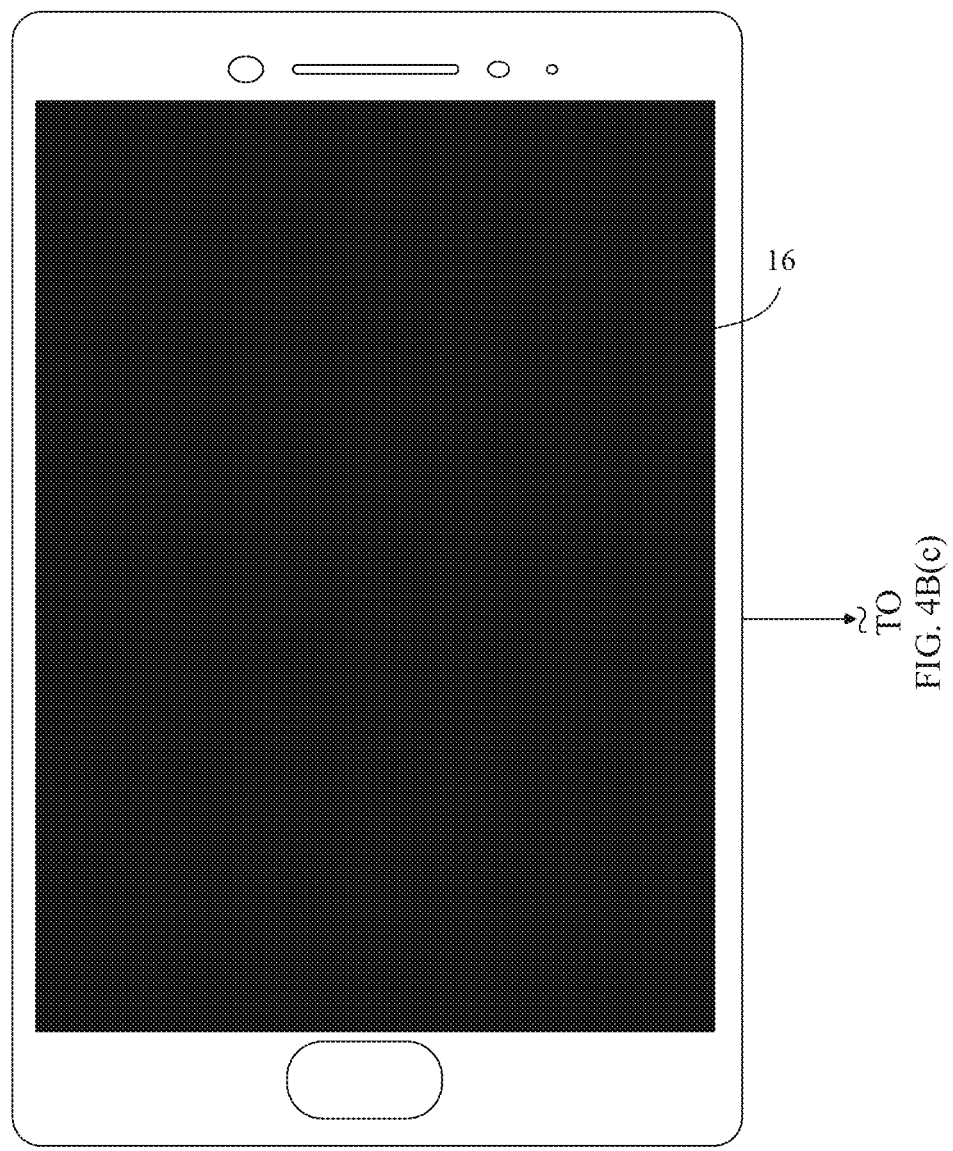
Figure 4B:
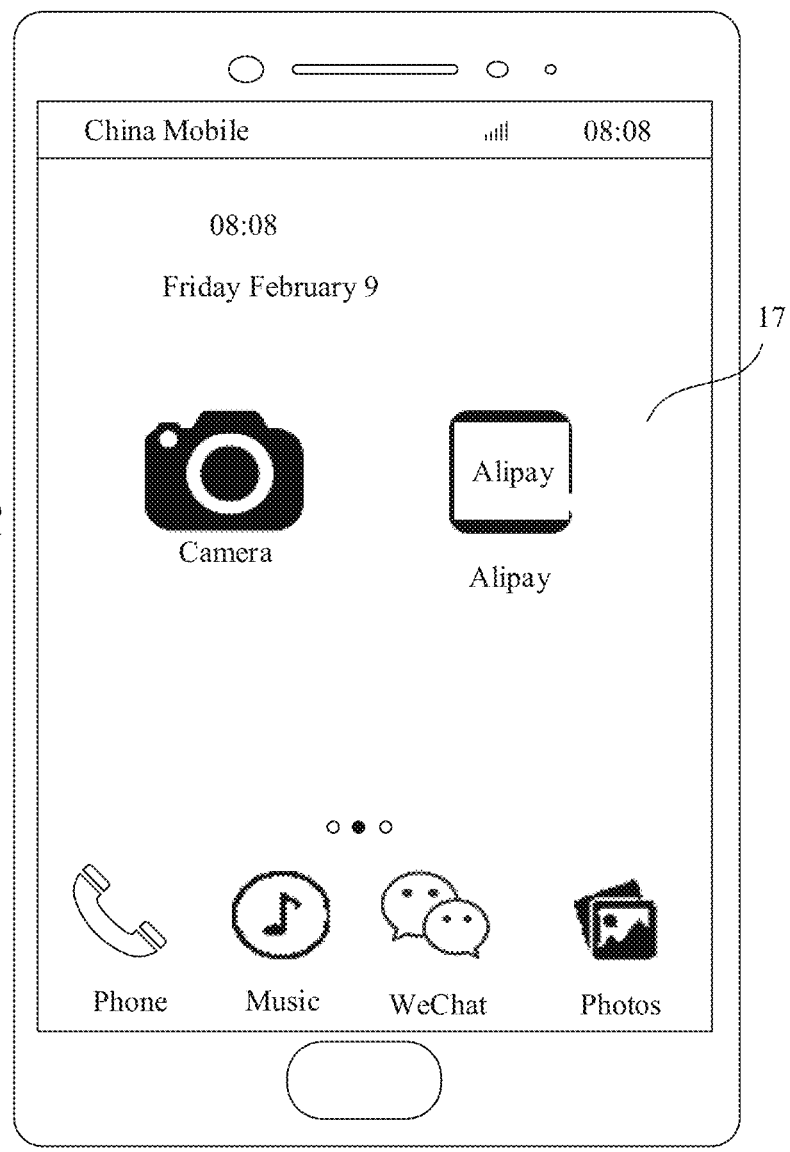
Figure 4B:
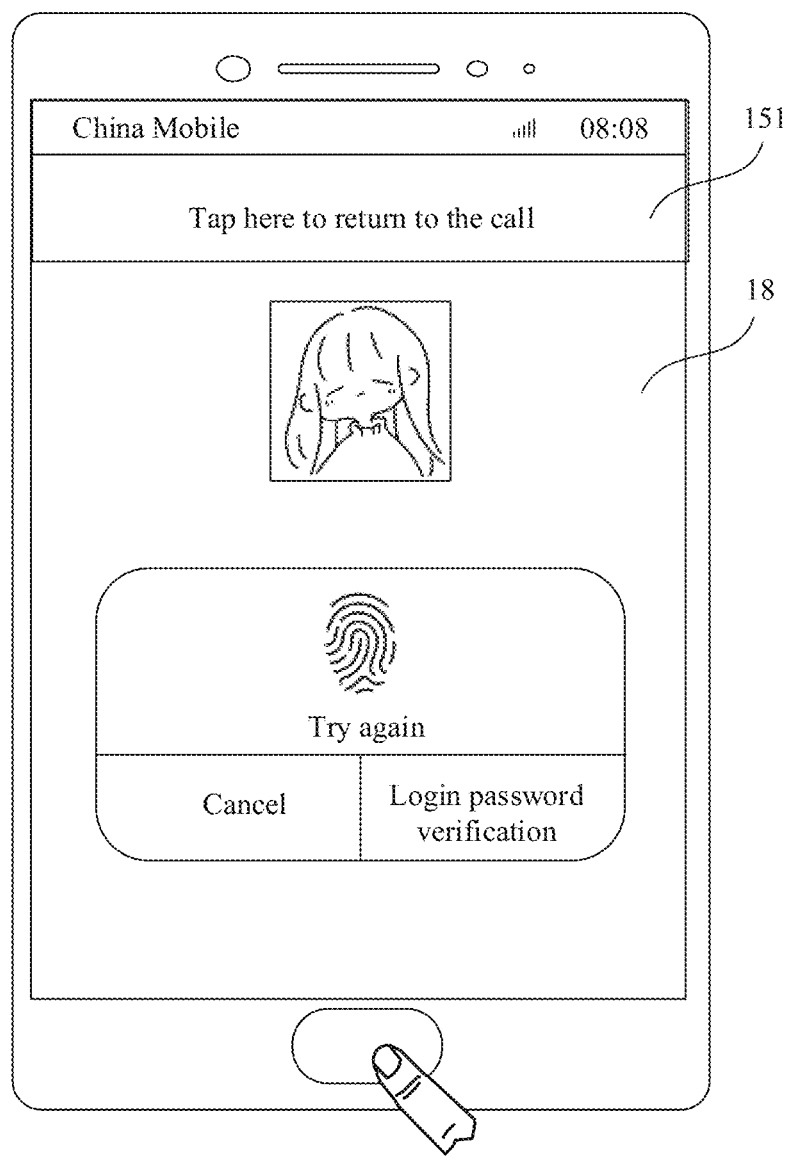

For example, a description is provided by using an example in which a mobile phone is still used as the electronic device. If a user uses a fingerprint recognition function of an Alipay application during a call, the mobile phone displays an interface 15 shown in FIG. 4B(a). The interface 15 displays a call function prompt area 151, to prompt that the user can return to a call interface by tapping the call function prompt area 151. When switching to another page in a process of providing a call function, the mobile phone displays the call function prompt area 151. After the mobile phone acquires a fingerprint of the user, an REE OS of the mobile phone invokes a security service module in a TEE to perform operations such as matching the acquired fingerprint of the user with a fingerprint record.

In a conventional technology, if the TEE OS crashes in a fingerprint matching process, the mobile phone automatically shuts off and restarts to restore the security service. For example, after the TEE OS crashes, the mobile phone displays a black screen (shutdown) interface 16 shown in FIG. 4B(b). During restarting of the mobile phone, the mobile phone cannot provide services (including a fingerprint-based payment function and a call function) for the user. After the mobile phone restarts, a home screen interface 17 shown in FIG. 4B(c) is displayed. In this case, the user needs to use a call function by performing a plurality of operations such as tapping a call application icon in the home screen interface 17 and entering a phone number. The user further needs to restart the fingerprint-based payment function of the Alipay application by performing a plurality of operations such as tapping an Alipay application icon in the home screen interface 17. It can be learned that, it takes a long time for performing a process of restoring the security service in the conventional technology.

In this embodiment of this application, if the TEE OS crashes in a fingerprint matching process, current fingerprint matching fails. In this case, the mobile phone may display an interface 18 shown in FIG. 4B(d). The interface 18 displays a call function prompt area 151, indicating that a call service is being provided. It can be noted that, in this case, the mobile phone cannot provide the fingerprint-based payment function, but the call function of the mobile phone is not affected. It can be learned that, by using the method for handling a trusted execution environment operating system crash provided in this embodiment of this application, a time required from a time point at which the TEE OS crashes to a time point at which the security service is restored can be effectively reduced. In addition, in this process, the mobile phone may continue to provide a service other than the security service for the user.

Figure 5:
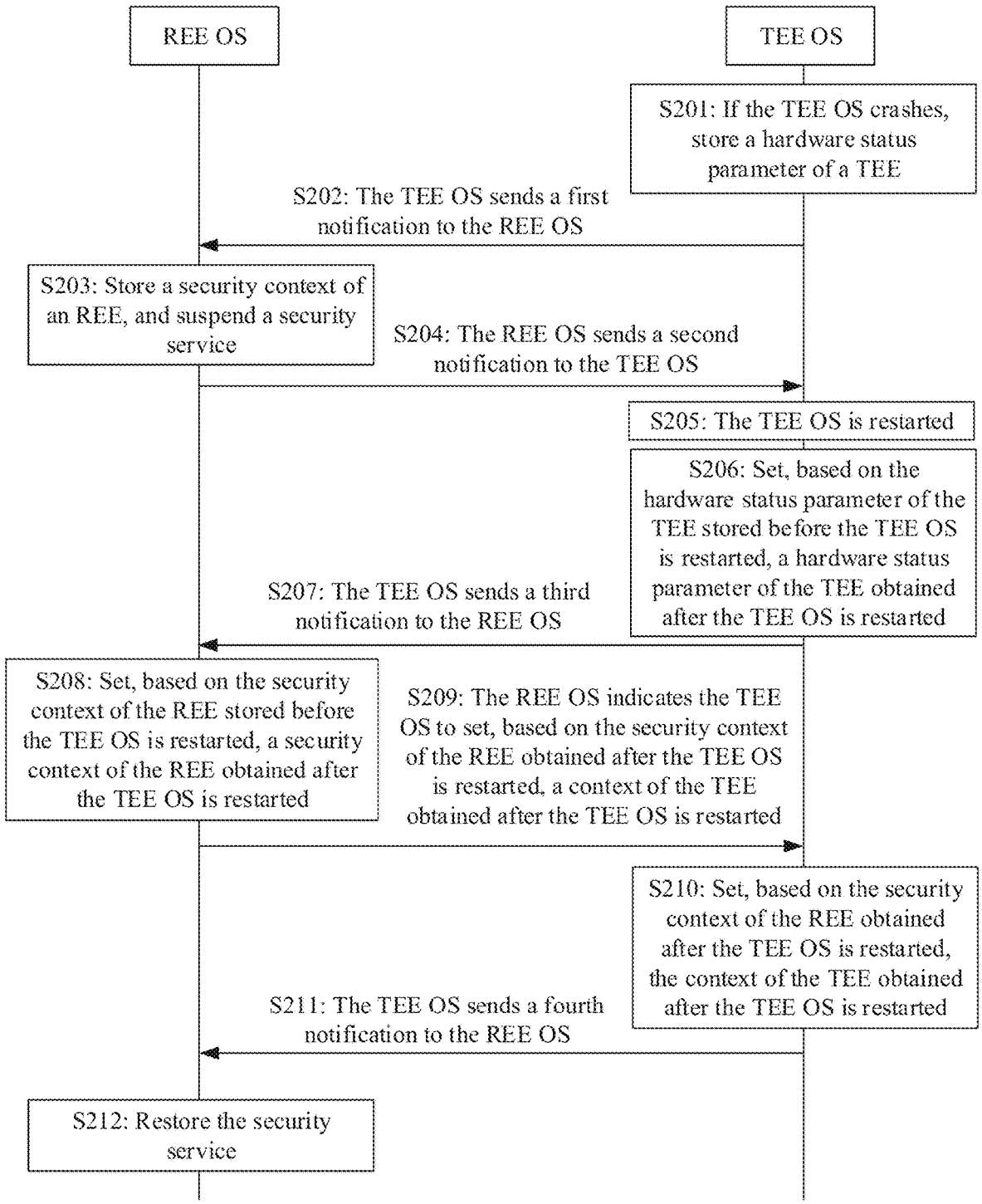
FIG. 5 is a schematic flowchart 2 of a method for handling a trusted execution environment operating system crash according to an embodiment of this application.

FIG. 5 is a schematic flowchart of another method for handling a trusted execution environment operating system crash according to an embodiment of this application. The method may include operation S201 to operation S212.

S201: If a TEE OS crashes, the TEE OS stores a hardware status parameter of a TEE.

Refer to the structure shown in FIG. 2. In a process in which the TEE provides a security service for the application in an REE, if the TEE OS crashes, a TEE security status storage module in a TEE abnormality handling module may be configured to store a hardware status parameter of the TEE. The hardware status parameter of the TEE may include data in each register in the TEE.

For other content, refer to related descriptions of operation S101. Details are not described herein again.

S202: The TEE OS sends a first notification to an REE OS.

For example, after learning that the TEE security status storage module stores the hardware status parameter of the TEE, the TEE sends the first notification to the REE. For example, the TEE abnormality handling module in the TEE may send the first notification to a security service module in the REE. For another example, after storing the security hardware status parameter of the TEE, the TEE abnormality handling module in the TEE provides a notification for a specific module in the TEE OS, and the specific module in the TEE OS sends the first notification to the security service module in the REE, or sends the first notification to the security service module in the REE by using a module in the REE. This is not limited in this embodiment of this application.

The first notification may be used to notify that the TEE OS has crashed, so that the REE OS performs a corresponding operation. Alternatively, the first notification may be directly used to indicate the REE to perform a corresponding operation. In specific implementation, the first notification may be a message in a fixed format, or a message carrying specific content. A specific format and content of the first notification are not limited in this embodiment of this application.

For other content, refer to related descriptions of operation S101. Details are not described herein again.

S203: The REE OS stores a security context of the REE, and suspends a security service.

For example, after receiving the first notification, the security service module on an REE side may first invoke an REE security status storage module in the security service module to store the security context of the REE, and then invoke a security service suspension module to suspend the security service. Alternatively, the security service module may first invoke the security service suspension module to suspend the security service, and then invoke the REE security status storage module in the security service module to store the security context of the REE. Alternatively, the security service module may invoke both modules to perform corresponding steps. In other words, in this embodiment of this application, a time sequence of storing the security context of the REE and suspending the security service is not limited.

For other content, refer to related descriptions of operation S102. Details are not described herein again.

S204: The REE OS sends a second notification to the TEE OS.

For example, after learning that the security service suspension module suspends the security service, the REE sends the second notification to the TEE abnormality handling module on a TEE side. For example, the security service module in the REE may send the second notification to the TEE abnormality handling module in the TEE. For another example, after suspending the security service, the security service suspension module in the REE provides a notification for a specific module in the REE OS, and the specific module in the REE OS sends the second notification to the TEE abnormality handling module in the TEE, or sends the second notification to the TEE abnormality handling module in the TEE by using a module in the TEE. This is not limited in this embodiment of this application.

The second notification may be used to notify the TEE OS that the REE side is ready, so that the TEE OS performs a corresponding operation. Alternatively, the second notification may be directly used to indicate the TEE to perform a corresponding operation. In specific implementation, the second notification may be a message in a fixed format, or a message carrying specific content. A specific format and content of the second notification are not limited in this embodiment of this application.

For example, after learning that the security service suspension module suspends the security service, the REE may further send a fifth notification to an application corresponding to a security service in the REE, to notify that the security service in the TEE is unavailable. Then, after receiving the notification, the application suspends sending of a new security service request. A specific format and content of the fifth notification are not limited in this embodiment of this application.

For other content, refer to related descriptions of operation S102. Details are not described herein again.

S205: The TEE OS is restarted.

For example, after receiving the second notification, the TEE abnormality handling module on the TEE side invokes a TEE OS restarting module in the TEE abnormality handling module to restart the TEE OS.

For other content, refer to related descriptions of operation S103. Details are not described herein again.

S206: The TEE OS sets, based on the hardware status parameter of the TEE stored before the TEE OS is restarted, a hardware status parameter of the TEE obtained after the TEE OS is restarted.

For example, after the TEE OS restarting module restarts the TEE OS, the TEE abnormality handling module notifies a TEE initialization module that the TEE OS has been restarted, and may start to restore a security status on the TEE side. If the TEE initialization module on the TEE side learns that the TEE OS has been restarted, the TEE initialization module invokes a TEE security status restoration module to obtain, from the TEE security status storage module, the hardware status parameter of the TEE stored before the TEE OS is restarted, to set the hardware status parameter of the TEE obtained after the TEE OS is restarted.

For other content, refer to related descriptions of operation S104. Details are not described herein again.

S207: The TEE OS sends a third notification to the REE OS.

For example, after learning that the TEE security status restoration module restores the hardware status parameter of the TEE, the TEE sends the third notification to the REE. For example, the TEE initialization module in the TEE may send the third notification to the security service module in the REE. For another example, after restoring the security hardware status parameter of the TEE, the TEE initialization module in the TEE provides a notification for a specific module in the TEE OS, and the specific module in the TEE OS sends the third notification to the security service module in the REE, or sends the third notification to the security service module in the REE by using a module in the REE. This is not limited in this embodiment of this application.

The third notification may be used to notify that the hardware status parameter of the TEE has been restored, so that the REE OS performs a corresponding operation. Alternatively, the third notification may be directly used to indicate the REE to perform a corresponding operation. In specific implementation, the third notification may be a message in a fixed format, or a message carrying specific content. A specific format and content of the third notification are not limited in this embodiment of this application.

For other content, refer to related descriptions of operation S104. Details are not described herein again.

S208: The REE OS sets, based on the security context of the REE stored before the TEE OS is restarted, a security context of the REE obtained after the TEE OS is restarted.

S209: The REE OS indicates the TEE OS to set, based on the security context of the REE obtained after the TEE OS is restarted, a context of the TEE obtained after the TEE OS is restarted.

S210: The TEE OS sets, based on the security context of the REE obtained after the TEE OS is restarted, the context of the TEE obtained after the TEE OS is restarted.

S211: The TEE OS sends a fourth notification to the REE OS.

For example, in steps S208 to S211, after receiving the third notification sent by the TEE, the security service module on the REE side invokes an REE security status restoration module to start a security context restoration procedure. The REE security status restoration module obtains, from the REE security status storage module, the security context of the REE stored before the TEE OS is restarted, restores, based on the security context of the REE stored before the TEE OS is restarted, the security context of the REE obtained after the TEE OS is restarted, and sends requests for registration of some or all of security services to the TEE security status restoration module in the TEE. After restoring, according to the registration requests, contexts of the TEE obtained after the corresponding security services is restarted, the TEE security status restoration module sends a notification to the REE security status restoration module, to feed back that current registration is completed. The REE security status restoration module continues to send, based on the security context of the REE stored before the REE OS is restarted, a security service registration request that is not sent. In an interaction process between the REE security status restoration module and the TEE security status restoration module, registration of the security services is completed, and the security context of the REE and the context of the TEE are restored to states existing before the TEE OS crashes. The last registration request sent by the REE security status restoration module to the TEE carries a fixed identifier, to notify the TEE that restoration of security contexts of the REE and the contexts of the TEE is completed after a security service is restored according to the registration request. Alternatively, after the TEE has not received a registration request within a preset time period, the TEE learns that restoration of the security contexts of the REE and the contexts of the TEE is completed.

After the TEE learns that restoration of the security contexts of the REE and the contexts of the TEE is completed, the TEE abnormality handling module sends the fourth notification to the REE. For example, the TEE abnormality handling module in the TEE may send the fourth notification to the security service module in the REE. For another example, after learning that restoration of the security contexts of the REE and the contexts of the TEE is completed, the TEE abnormality handling module in the TEE provides a notification for a specific module in the TEE OS, and the specific module in the TEE OS sends the fourth notification to the security service module in the REE, or sends the fourth notification to the security service module in the REE by using a module in the REE. This is not limited in this embodiment of this application.

The fourth notification may be used to notify that the security contexts of the REE and the contexts of the TEE have been restored, so that the REE OS performs a corresponding operation. Alternatively, the fourth notification may be directly used to indicate the REE to perform a corresponding operation. In specific implementation, the fourth notification may be a message in a fixed format, or a message carrying specific content. A specific format and content of the fourth notification are not limited in this embodiment of this application.

It should be noted that, in the figure, processes of setting the security context of the REE in operation S208 and indicating to set the context of the TEE in operation S209 are alternately performed. For example, after setting one or more security contexts of the REE in operation S208, the REE indicates the TEE to set corresponding contexts. Then, the REE continues to set another security context of the REE, indicates the TEE to set a corresponding context, and so on.

For other content, refer to related descriptions of operation S105. Details are not described herein again.

S212: The REE OS restores the security service.

After receiving the fourth notification, the security service module on the REE side stops running the security service suspension module, to restore the security service.

For other content, refer to related descriptions of operation S106. Details are not described herein again.

In the technical solution provided in operation S201 to operation S212, after the TEE OS crashes, the REE OS may not proactively exit the security service. Because the REE OS is not restarted in this application, the REE may reserve some data for previously calling the security service, for example, a memory address, but the data is already ineffective. In this case, after the REE OS restores the security service, that is, after operation S212 is performed, the REE receives, for the first time, a security service request sent by an application, and initiates a security service request to the TEE based on the security service data reserved by the REE. However, because the security data previously reserved by the REE is already ineffective, a current connection fails. Then, a daemon process of the REE restarts a security service, that is, sends a security service request to the TEE side again. The daemon process (daemon) is a special process that runs in a background and is used to perform a specific system task. Some daemon processes are started when a system boots and runs until the system shuts down. Some other daemon processes are started only when needed, and automatically end when a task is completed. In this embodiment of this application, after a security service fails to be started, a daemon process may reestablish a connection and start a security service.

Figure 6A:
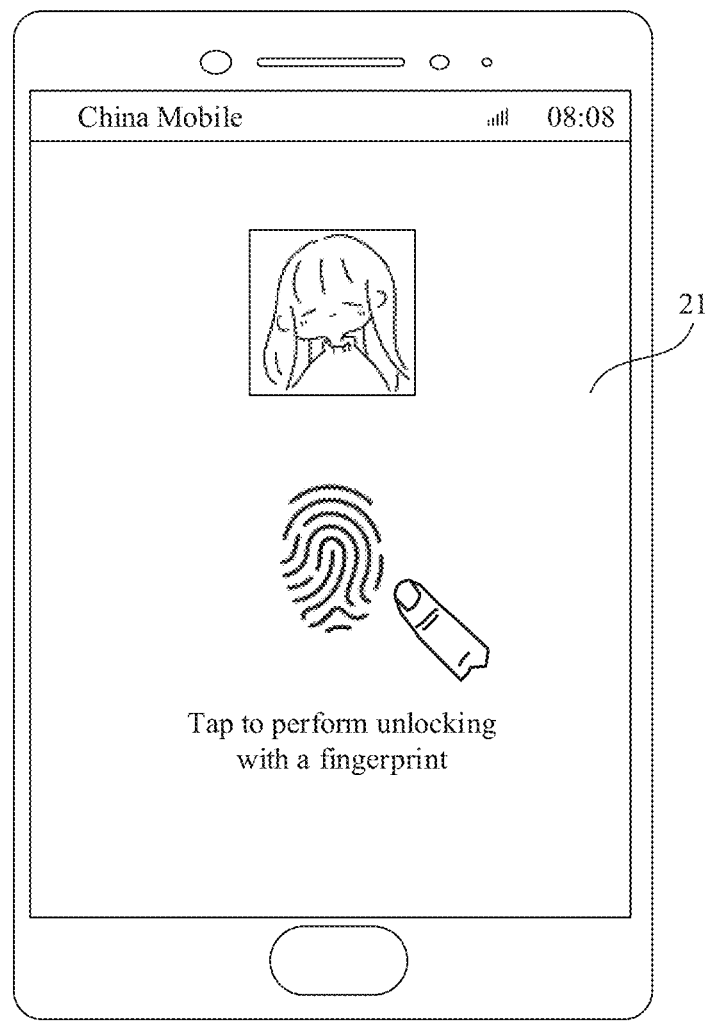
FIG. 6(a), FIG. 6(b), FIG. 6(c), FIG. 6(d), and FIG. 6(e) are a schematic diagram 3 of an application scenario of a method for handling a trusted execution environment operating system crash according to an embodiment of this application.
Figure 6B:
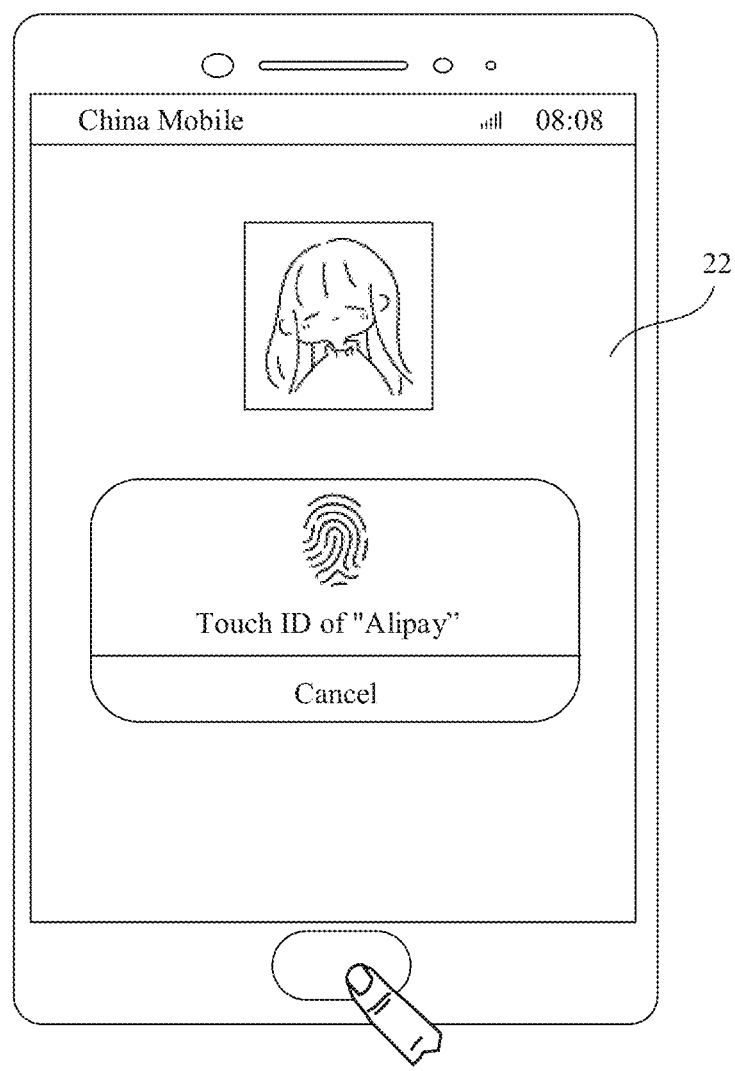
Figure 6C:
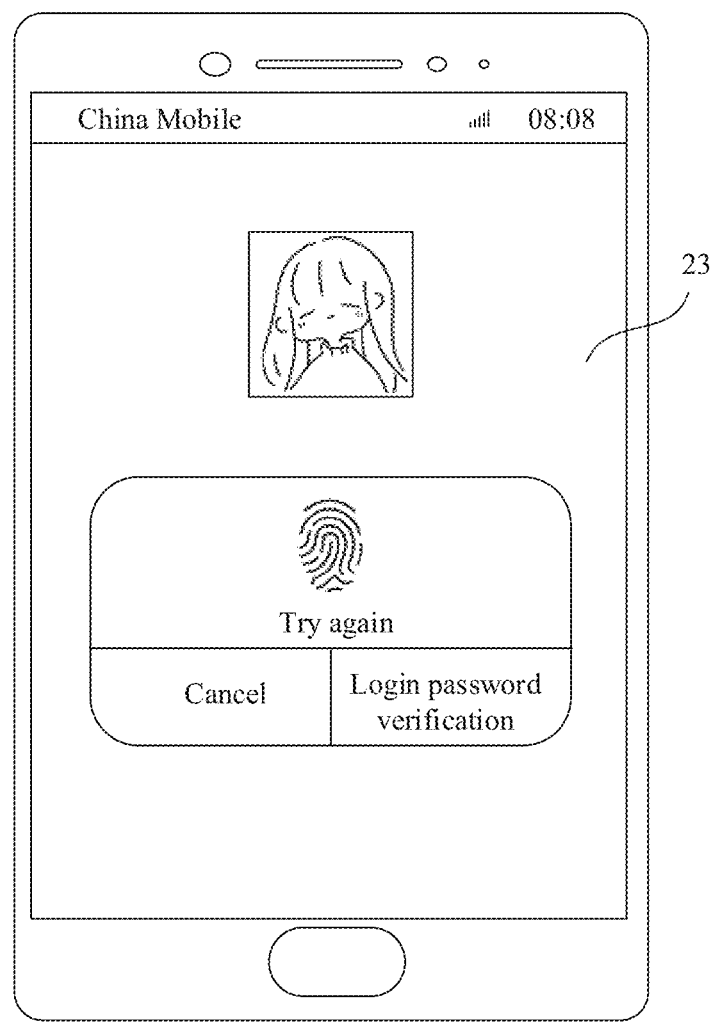
Figure 6D:
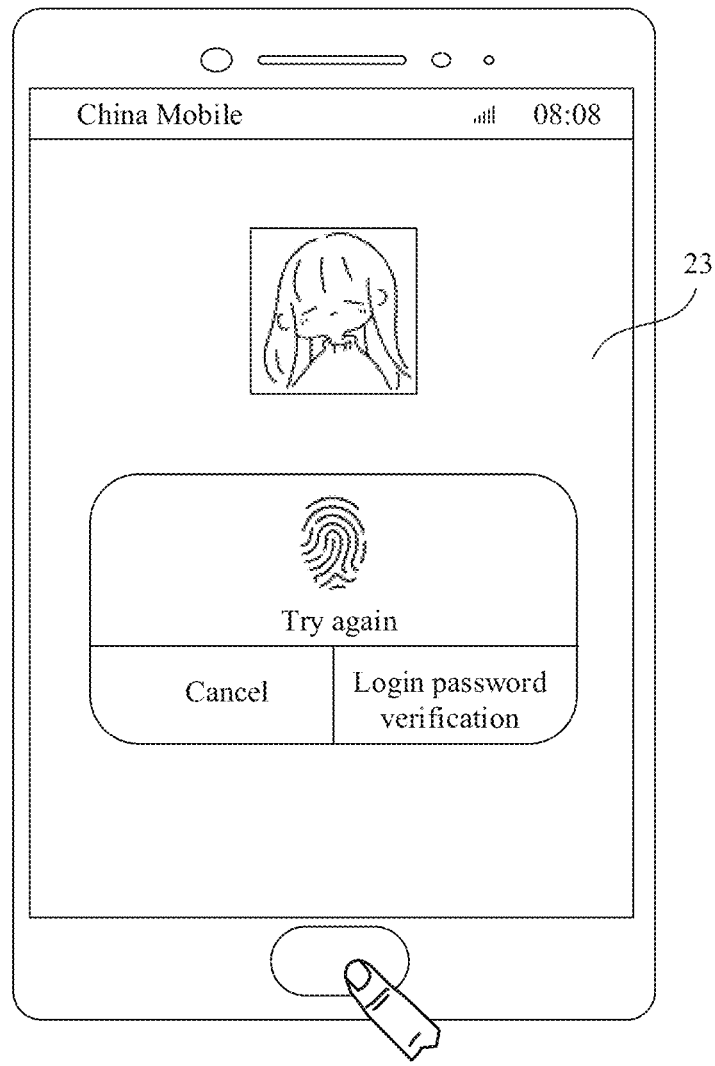
Figure 6E:
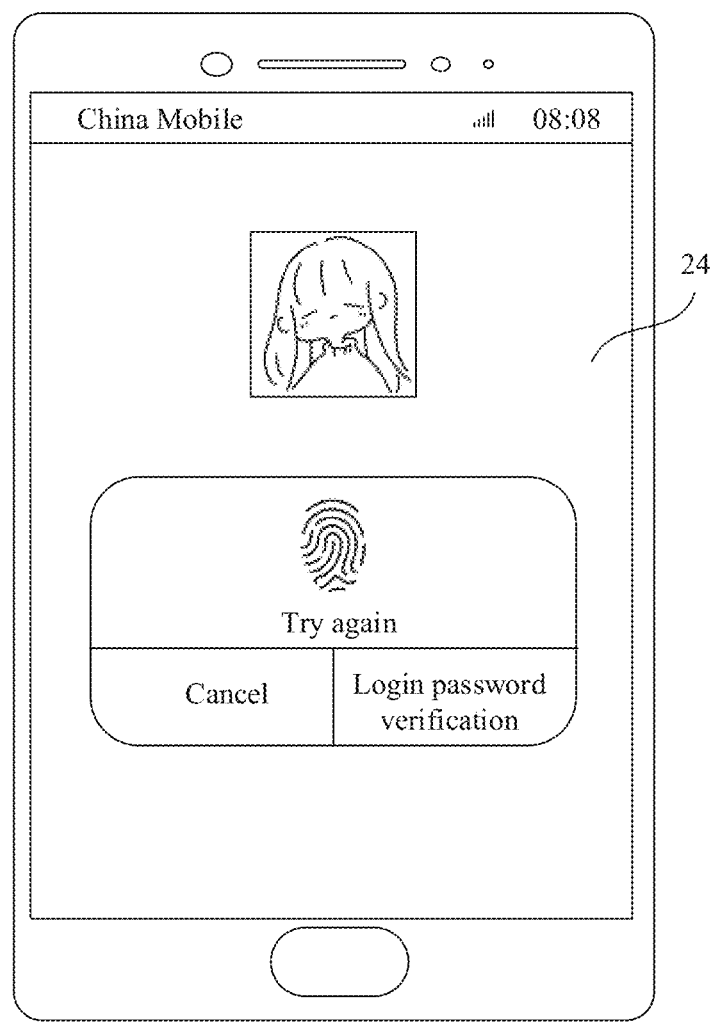

For example, a mobile phone is used as an electronic device. FIG. 6(a) shows an interface 21. The interface 21 is an interface that is of an Alipay application of the mobile phone and that provides a fingerprint-based unlocking function. In this case, the mobile phone prompts that the user can perform fingerprint-based unlocking by tapping a screen. After detecting an operation of tapping the screen by the user, the mobile phone displays an interface 22 shown in FIG. 6(b). The interface 22 is an interface for acquiring a fingerprint of the user. After the mobile phone acquires the fingerprint entered by the user, an REE OS of the mobile phone performs, by invoking a security service module in a TEE, operations such as matching the fingerprint entered by the user with a fingerprint record. If a TEE OS crashes in a fingerprint matching process, the mobile phone may display an interface 23 shown in FIG. 6(c). The interface 23 is used to indicate, to the user, that current unlocking fails (fingerprint matching fails) and indicate the user to enter the fingerprint again. The TEE OS is restarted. As shown in FIG. 6(d), after the TEE OS is restarted, the user enters the fingerprint on the interface 23. The mobile phone acquires the fingerprint of the user again, and sends the acquired fingerprint of the user to the TEE for matching with a fingerprint record. If the TEE fails in matching, an interface 24 shown in FIG. 6(e) is displayed.

Figure 7A:
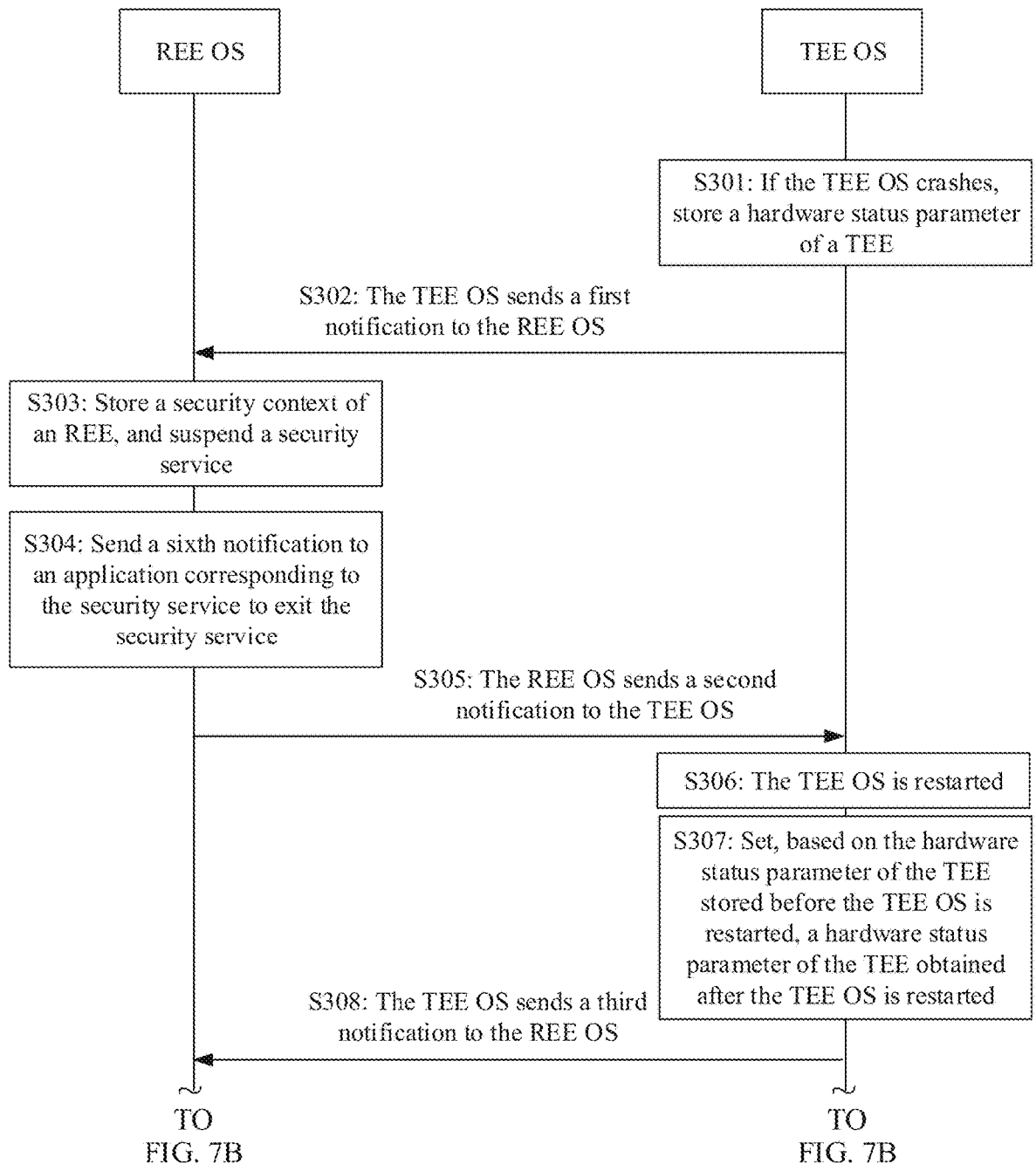
FIG. 7A and FIG. 7B are a schematic flowchart 3 of a method for handling a trusted execution environment operating system crash according to an embodiment of this application.
Figure 7B:
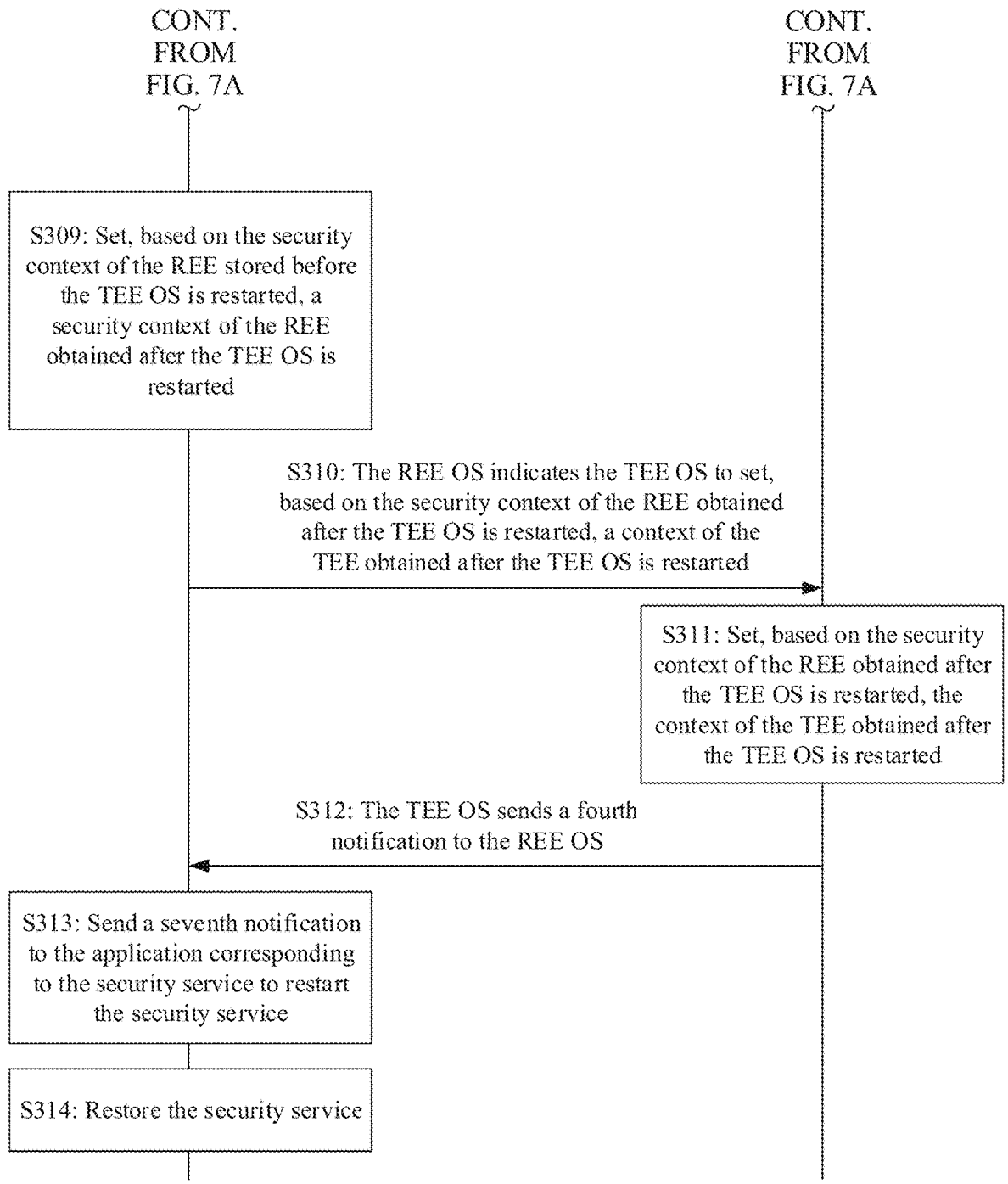

FIG. 7A and FIG. 7B are a schematic flowchart of another method for handling a trusted execution environment operating system crash according to an embodiment of this application. The method may include operation S301 to operation S314.

S301: If a TEE OS crashes, the TEE OS stores a hardware status parameter of a TEE. S302: The TEE OS sends a first notification to an REE OS.

S303: The REE OS stores a security context of an REE, and suspends a security service.

For steps S301 to S303, refer to the related descriptions of steps S201 to S203. Details are not described herein again.

S304: The REE OS sends a sixth notification to an application corresponding to the security service to exit the security service.

In some embodiments, after the REE OS suspends the security service, the REE OS may proactively exit the security service. In the embodiment shown in FIG. 5, after the TEE OS crashes, the TEE OS is restarted independently, but the REE OS is not restarted. Therefore, the REE reserves some data for previously calling the security service, for example, a memory address, but the data may conflict with data obtained after the TEE OS is restarted. In this case, after the TEE OS is restarted, after receiving the first security service request sent by an application, the REE may not be able to invoke a corresponding security service module in the TEE. In this embodiment, after the TEE OS crashes, the REE OS suspends the security service, and may proactively exit the security service. After the TEE OS is restarted, the security service is proactively restored. In this way, after the TEE OS is restarted, after receiving the first security service request sent by the application, the REE can normally invoke the corresponding security service module in the TEE.

In some embodiments of this application, the security service module on an REE side sends a sixth notification to the application that is included in an electronic device and that is corresponding to the security service, to exit the security service. Alternatively, the sixth notification is code in a fixed format or with fixed content, and the application corresponding to the security service automatically exits the security service after receiving the sixth notification. A specific format and content of the sixth notification are not limited in this embodiment of this application.

S305: The REE OS sends a second notification to the TEE OS.

S306: The TEE OS is restarted.

S307: The TEE OS sets, based on the hardware status parameter of the TEE stored before the TEE OS is restarted, a hardware status parameter of the TEE obtained after the TEE OS is restarted.

S308: The TEE OS sends a third notification to the REE OS.

S309: The REE OS sets, based on the security context of the REE stored before the TEE OS is restarted, a security context of the REE obtained after the TEE OS is restarted.

S310: The REE OS indicates the TEE OS to set, based on the security context of the REE obtained after the TEE OS is restarted, a context of the TEE obtained after the TEE OS is restarted.

S311: The TEE OS sets, based on the security context of the REE obtained after the TEE OS is restarted, the context of the TEE obtained after the TEE OS is restarted.

S312: The TEE OS sends a fourth notification to the REE OS.

For steps S305 to S312, refer to the related descriptions of steps S204 to S211. Details are not described herein again.

S313: Send a seventh notification to the application corresponding to the security service to restart the security service.

For example, before the REE OS restores the security service, the electronic device proactively exits the security service and proactively restarts in operation S304, to establish a new connection to provide the security service.

In some embodiments of this application, the structure shown in FIG. 2 is used as an example. The security service module on the REE side sends the seventh notification to the application that is in the electronic device and that is corresponding to the security service that has proactively exited after the TEE OS crashes, to restart the security service that has exited. Alternatively, the seventh notification is code in a fixed format or with fixed content, and the application corresponding to the security service automatically starts the security service after receiving the sixth notification. A specific format and content of the seventh notification are not limited in this embodiment of this application.

S314: The REE OS restores the security service.

For example, for other content included in operation S314, refer to operation S212. Details are not described herein again.

In the technical solution provided in operation S301 to operation S314, after the TEE OS crashes, the REE OS may proactively exit the security service, and proactively restart the security service after the TEE OS is restarted. Because the REE OS is not restarted in this application, the REE may reserve some data for previously calling the security service, for example, a memory address, but the data is already ineffective. After the TEE OS crashes, the security service is proactively exited, and the data may be cleared. In this case, after the REE OS restores the security service, that is, after operation S314 is performed, the REE receives, for the first time, a security service request sent by an application, and initiates a security service request to the TEE.

Figure 8A:
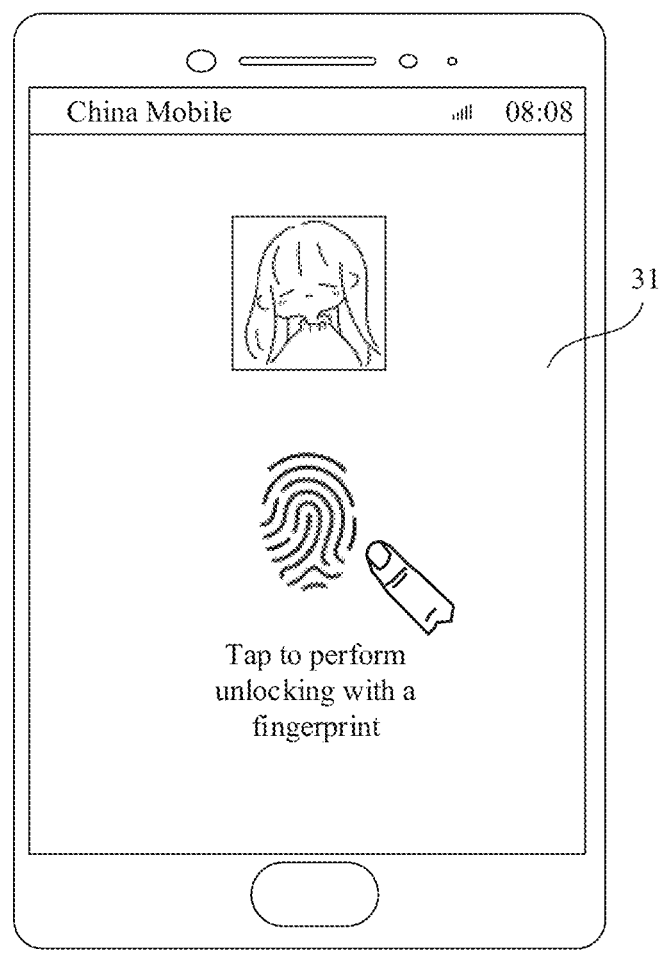
FIG. 8(a), FIG. 8(b), FIG. 8(c), FIG. 8(d), and FIG. 8(e) are a schematic diagram 4 of an application scenario of a method for handling a trusted execution environment operating system crash according to an embodiment of this application.
Figure 8B:
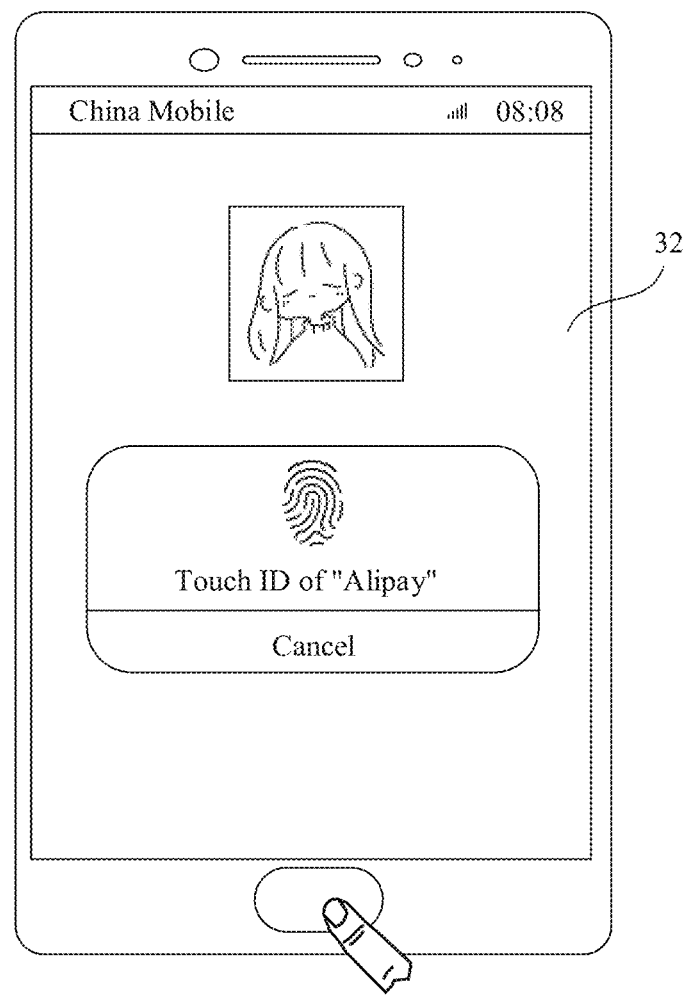
Figure 8C:
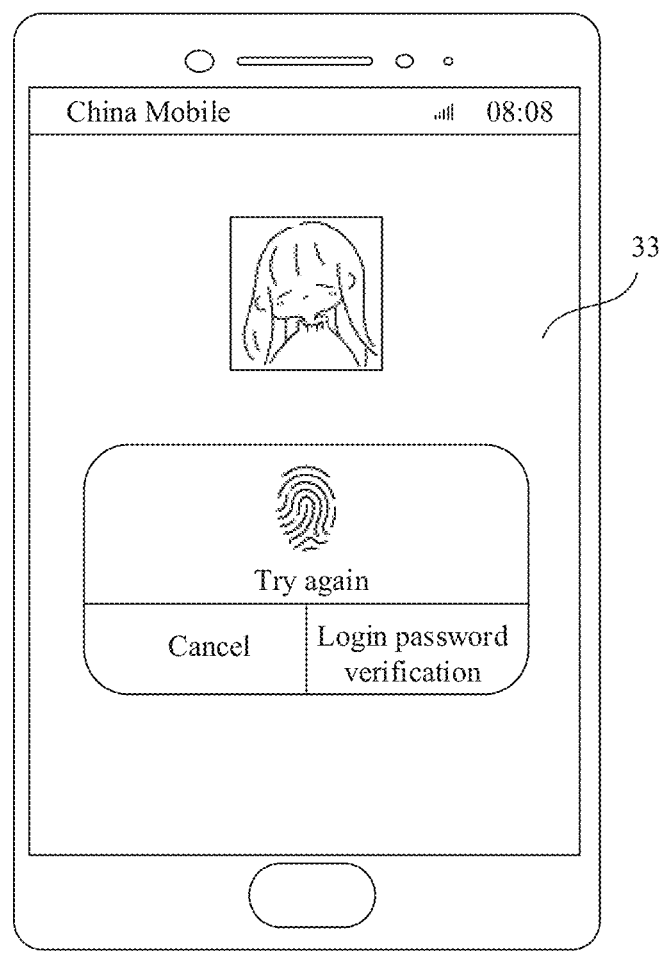
Figure 8D:
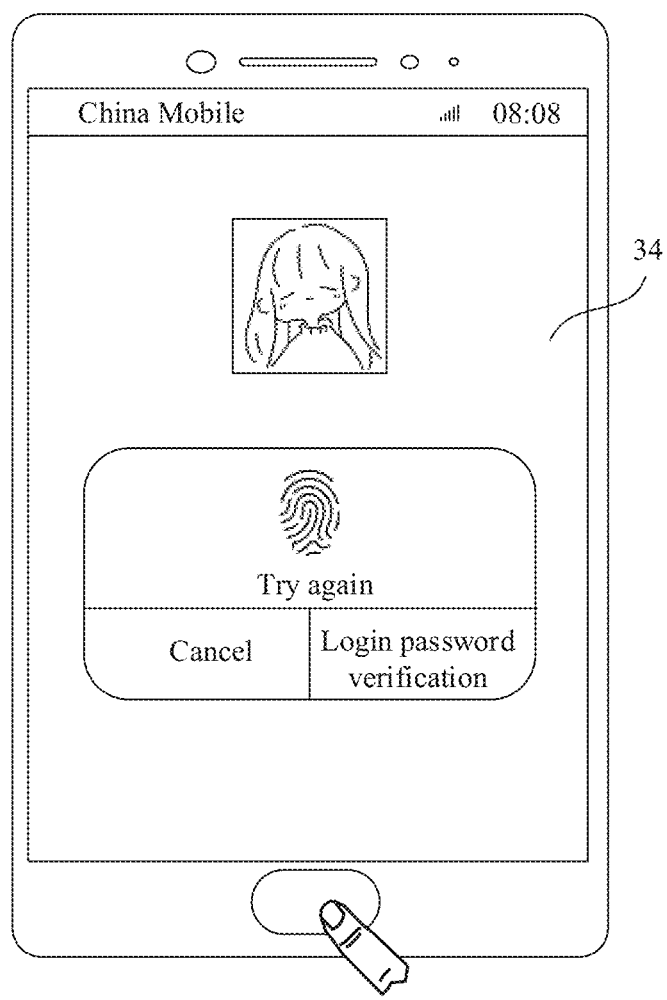
Figure 8E:
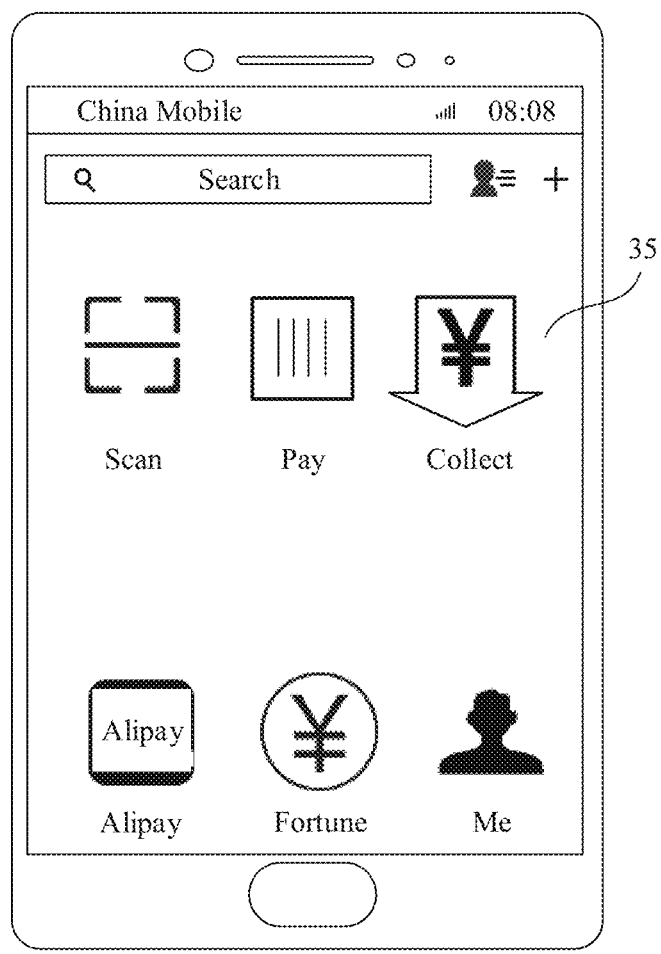

For example, a mobile phone is used as an electronic device. FIG. 8(a) shows an interface 31. The interface 31 is an interface that is of an Alipay application of the mobile phone and that provides a fingerprint-based unlocking function. In this case, the mobile phone prompts that the user can perform fingerprint-based unlocking by tapping a screen. After detecting an operation of tapping the screen by the user, the mobile phone displays an interface 32 shown in FIG. 8(b). The interface 32 is an interface for entering a fingerprint of the user. After the mobile phone acquires the fingerprint entered by the user, an REE OS of the mobile phone performs, by invoking a security service module in a TEE, operations such as matching the fingerprint entered by the user with a fingerprint record. If a TEE OS crashes in a fingerprint matching process, the mobile phone may display an interface 33 shown in FIG. 8(*c*). The interface 33 is used to indicate, to the user, that current unlocking fails (fingerprint matching fails) and indicate the user to enter the fingerprint again.

As shown in FIG. 8(*d*), after the TEE OS is restarted, the user may enter the fingerprint on the interface 34. After acquiring the fingerprint entered by the user, the mobile phone invokes a security service on a TEE side to perform fingerprint matching. If fingerprint matching succeeds, the mobile phone is unlocked, and displays an Alipay home page 35 shown in FIG. 8(*e*). It can be learned that, compared with a solution in which the REE OS does not proactively exit a security service after the TEE OS crashes, this embodiment can improve accuracy of performing the security service for the first time after the TEE OS is restarted.

Figure 9:
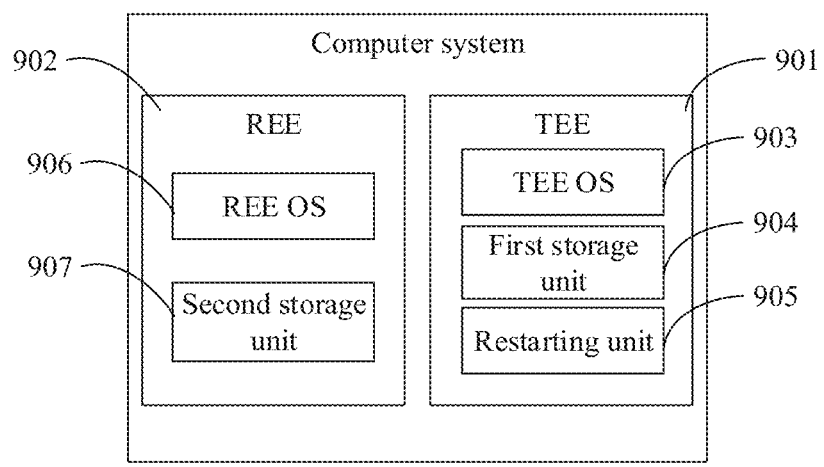
FIG. 9 is a schematic diagram of a structure of a computer system according to an embodiment of this application.

FIG. 9 is a schematic diagram of an example structure of a computer system in the foregoing embodiments. The computer system includes a TEE 901 and an REE 902, and the TEE 901 provides a security service for the REE 902. The TEE 901 includes a TEE OS 903, a first storage unit 904, and a restarting unit 905, and the REE 902 includes an REE OS 906 and a second storage unit 907.

The TEE OS 903 is configured to support the computer system in performing operation S104 and operation S105 in FIG. 3, operation S206 and operation S210 in FIG. 5, operation S307 and operation S311 in FIG. 7A and FIG. 7B, and/or used in another process of the technology described in this specification.

The first storage unit 904 is configured to support the computer system in performing operation S101 in FIG. 3, operation S201 in FIG. 5, operation S301 in FIG. 7A, and/or used in another process of the technology described in this specification.

The restarting unit 905 is configured to support the computer system in performing operation S103 in FIG. 3, operation S205 in FIG. 5, operation S306 in FIG. 7A, and/or used in another process of the technology described in this specification.

The REE OS 906 is configured to support the computer system in performing operation S102, operation S105, and operation S106 in FIG. 3, operation S203, operation S208, and operation S212 in FIG. 5, operation S303, operation S304, operation S309, operation S313, and operation S314 in FIG. 7A and FIG. 7B, and/or used in another process of the technology described in this specification.

The second storage unit 907 is configured to support the computer system in performing operation S102 in FIG. 3, operation S203 in FIG. 5, operation S303 in FIG. 7A, and/or used in another process of the technology described in this specification.

All related content of each operation involved in the foregoing method embodiment may be referenced to a function description of a corresponding functional unit, and details are not described herein again.

Figure 10:
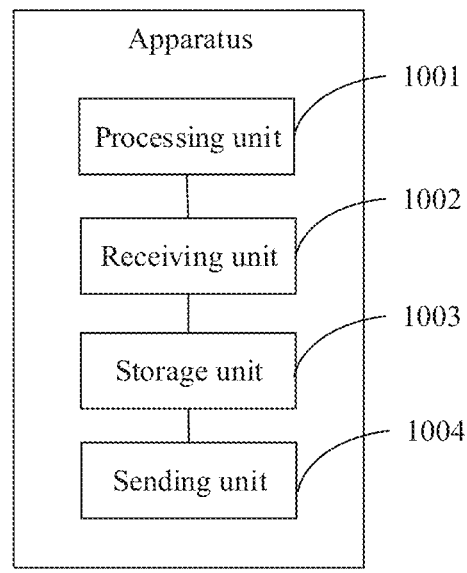
FIG. 10 is a schematic diagram 1 of a structure of an apparatus for handling a trusted execution environment operating system crash according to an embodiment of this application.

FIG. 10 is a schematic diagram of an example structure of an apparatus for handling a trusted execution environment operating system crash in the foregoing embodiments. The apparatus includes a processing unit 1001, a receiving unit 1002, a storage unit 1003, and a sending unit 1004.

The processing unit 1001 is configured to support the apparatus in performing operation S102, operation S105, and operation S106 in FIG. 3, operation S203, operation S208, and operation S212 in FIG. 5, operation S303, operation S309, and operation S314 in FIG. 7A and FIG. 7B, and/or used in another process of the technology described in this specification.

The receiving unit 1002 is configured to support the apparatus in performing operation S202, operation S207, and operation S211 in FIG. 5, operation S302, operation S308, and operation S312 in FIG. 7A and FIG. 7B, and/or used in another process of the technology described in this specification.

The storage unit 1003 is configured to support the apparatus in performing operation S102 in FIG. 3, operation S203 in FIG. 5, operation S303 in FIG. 7A, and/or used in another process of the technology described in this specification.

The sending unit 1004 is configured to support the apparatus in performing operation S204 and operation S209 in FIG. 5, operation S304, operation S305, operation S310, and operation S313 in FIG. 7A and FIG. 7B, and/or used in another process of the technology described in this specification.

All related content of each operation involved in the foregoing method embodiment may be referenced to a function description of a corresponding functional unit, and details are not described herein again.

Figure 11:
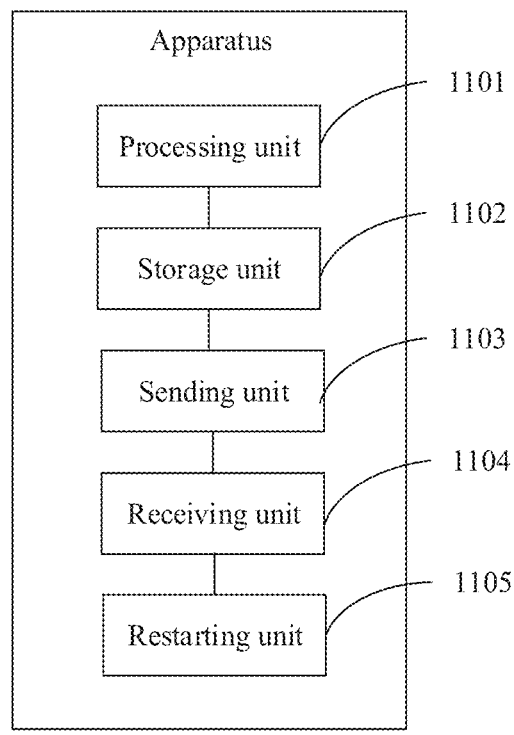
FIG. 11 is a schematic diagram 2 of a structure of an apparatus for handling a trusted execution environment operating system crash according to an embodiment of this application.

FIG. 11 is a schematic diagram of an example structure of an apparatus for handling a trusted execution environment operating system crash in the foregoing embodiments. The apparatus includes a processing unit 1101, a storage unit 1102, a sending unit 1103, a receiving unit 1104, and a restarting unit 1105.

The processing unit 1101 is configured to support the apparatus in performing operation S104 and operation S105 in FIG. 3, operation S206 and operation S210 in FIG. 5, operation S307 and operation S311 in FIG. 7A and FIG. 7B, and/or used in another process of the technology described in this specification.

The storage unit 1102 is configured to support the apparatus in performing operation S101 in FIG. 3, operation S201 in FIG. 5, operation S301 in FIG. 7A, and/or used in another process of the technology described in this specification.

The sending unit 1103 is configured to support the apparatus in performing operation S202, operation S207, and operation S211 in FIG. 5, operation S302, operation S308, operation S312, operation S304, and operation S313 in FIG. 7A and FIG. 7B, and/or used in another process of the technology described in this specification.

The receiving unit 1104 is configured to support the apparatus in performing operation S204 and operation S209 in FIG. 5, operation S305 and operation S310 in FIG. 7A and FIG. 7B, and/or used in another process of the technology described in this specification.

The restarting unit 1105 is configured to support the apparatus in performing operation S103 in FIG. 3, operation S205 in FIG. 5, operation S306 in FIG. 7A, and/or used in another process of the technology described in this specification.

All related content of each operation involved in the foregoing method embodiment may be referenced to a function description of a corresponding functional unit, and details are not described herein again.

Figure 12:
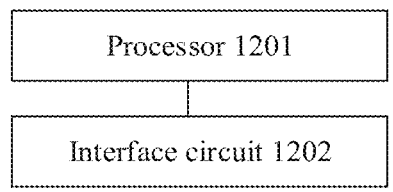
FIG. 12 is a schematic diagram of a structure of a chip system according to an embodiment of this application.

An embodiment of this application further provides a chip system. As shown in FIG. 12, the chip system includes at least one processor 1201 and at least one interface circuit 1202. The processor 1201 and the interface circuit 1202 may be connected to each other by using a wire. For example, the interface circuit 1202 may be configured to receive a signal from another apparatus. For another example, the interface circuit 1202 may be configured to send a signal to another apparatus (for example, the processor 1201). For example, the interface circuit 1202 may read instructions stored in a memory, and send the instructions to the processor 1201. When the instructions are executed by the processor 1201, an electronic device may be enabled to perform steps in the methods for handling a trusted execution environment operating system crash in the foregoing embodiments. Certainly, the chip system may further include another discrete device. This is not specifically limited in this embodiment of this application.

An embodiment of this application further provides a computer-readable storage medium. The computer-readable storage medium stores computer instructions; and when the computer instructions are run on an electronic device, the electronic device is enabled to perform the foregoing related method steps to implement the methods for handling a trusted execution environment operating system crash in the foregoing embodiments.

An embodiment of this application further provides a computer program product. When the computer program product is run on a computer, the computer is enabled to perform the foregoing related steps to implement the methods for handling a trusted execution environment operating system crash in the foregoing embodiments.

In addition, an embodiment of this application further provides an apparatus. The apparatus may be a component or a module. The apparatus may include a processor and a memory connected to each other. The memory is configured to store computer-executable instructions. When the apparatus runs, the processor can execute the computer-executable instructions stored in the memory, so that the apparatus performs the methods for handling a trusted execution environment operating system crash in the foregoing method embodiments.

The electronic device, the computer-readable storage medium, the computer program product, or the chip provided in embodiments of this application is configured to perform the corresponding method provided above. Therefore, for beneficial effects that can be achieved, refer to the beneficial effects of the corresponding method provided above. Details are not described herein again.

With descriptions of the foregoing embodiments, it may be clearly understood by a person skilled in the art that, for the purpose of convenient and brief description, division into the foregoing functional modules is used as an example for illustration. In an actual application, the foregoing functions can be allocated to different functional modules and implemented according to a requirement. That is, an inner structure of an apparatus is divided into different functional modules to implement all or some of the functions described above. For detailed working processes of the foregoing system, apparatus, and unit, refer to corresponding processes in the foregoing method embodiments, and details are not described herein again.

In the several embodiments provided in this application, it should be understood that the disclosed methods may be implemented in other manners. For example, the described mobile device embodiment is merely an example. For example, division into the module or unit is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program instructions, such as a flash memory, a removable hard disk, a read-only memory, a random access memory, a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for handling a trusted execution environment operating system crash, the method comprising:
   detecting, in an electronic device having a trusted execution environment (TEE) operating a security service and a rich execution environment (REE), a crash of a TEE operating system (OS) in a running process of the security service;
   storing, by the electronic device, a hardware status parameter of the TEE and a security context of the REE that are obtained when the TEE OS crashes, and suspending the security service;
   restarting, by the electronic device, the TEE OS;
   setting, by the electronic device based on the stored hardware status parameter of the TEE, a hardware status parameter of the TEE obtained after the TEE OS is restarted;
   setting, by the electronic device based on the stored security context of the REE, a security context of the REE obtained after the TEE OS is restarted and a context of the TEE obtained after the TEE OS is restarted; and
   restoring, by the electronic device, the security service.

2. The method for handling a trusted execution environment operating system crash according to claim 1, wherein a rich execution environment operating system REE OS is run in the REE; and the method further comprises:

after suspending the security service, notifying, by the electronic device by using the REE OS, an application corresponding to the security service that the security service is unavailable.

3. The method for handling a trusted execution environment operating system crash according to claim 2, wherein the method further comprises:
after suspending the security service, suspending, by the electronic device by using the REE OS, receiving of a security service request sent by any application in the REE.

4. The method for handling a trusted execution environment operating system crash according to claim 2, wherein the method further comprises:
after suspending the security service, indicating, by the electronic device by using the REE OS, the application corresponding to the security service to exit the security service; and
after restoring the security service, indicating, by the electronic device by using the REE OS, the application corresponding to the security service to restart the security service.

5. The method for handling a trusted execution environment operating system crash according to claim 1, wherein the security service comprises any one or more of a fingerprint matching service, a password verification service, and a face matching service.

6. The method for handling a trusted execution environment operating system crash according to claim 1, wherein the hardware status parameter of the TEE comprises data in a register in the TEE.

7. The method for handling a trusted execution environment operating system crash according to claim 1, wherein the security context of the REE comprises registration information of the security service.

8. A method for handling a trusted execution environment operating system crash, the method comprising:
providing, in an electronic device comprising a trusted execution environment (TEE) and a rich execution environment (REE), an REE operating system (OS) in the REE and a TEE OS in the TEE, wherein the TEE provides a security service for the REE;
receiving, by the REE OS, a first notification in a process in which the security service is called in the REE, wherein the first notification indicates that the TEE OS has crashed;
storing, by the REE OS, a security context of the REE, suspending the security service, and sending a second notification to the TEE OS to indicate to restart the TEE OS;
receiving, by the REE OS, a third notification, wherein the third notification is a notification that is sent by the TEE OS to the REE OS after the TEE OS sets a hardware status parameter of the TEE obtained after the TEE OS is restarted;
setting, by the REE OS based on the stored security context of the REE, a security context of the REE obtained after the TEE OS is restarted;
receiving, by the REE OS, a fourth notification, wherein the fourth notification is a notification that is sent by the TEE OS to the REE OS after the TEE OS sets a context of the TEE obtained after the TEE OS is restarted; and
restoring, by the REE OS, the security service.

9. The method for handling a trusted execution environment operating system crash according to claim 8, wherein after the suspending, by the REE OS, the security service, the method further comprises:
sending, by the REE OS, a fifth notification to an application corresponding to the security service, wherein the fifth notification is used to notify the application that the security service is unavailable.

10. The method for handling a trusted execution environment operating system crash according to claim 9, wherein after the suspending, by the REE OS, the security service, the method further comprises:
sending, by the REE OS, a sixth notification to the application corresponding to the security service to exit the security service; and
after the restoring, by the REE OS, the security service, the method further comprises:
sending, by the REE OS, a seventh notification to the application corresponding to the security service, to restart the security service.

11. The method for handling a trusted execution environment operating system crash according to claim 8, wherein after the suspending, by the REE OS, the security service, the method further comprises:
suspending, by the REE OS, receiving of a security service request sent by any application in the REE.

12. The method for handling a trusted execution environment operating system crash according to claim 8, wherein the security service comprises any one or more of a fingerprint matching service, a password verification service, and a face matching service.

13. The method for handling a trusted execution environment operating system crash according to claim 8, wherein the security context of the REE comprises registration information of the security service.

14. A computer system, comprising:
a rich execution environment (REE) comprising an REE operating system (REE OS) and a second storage unit; and
a trusted execution environment (TEE) to provide a security service for the REE, wherein the TEE comprises:
a TEE OS configured to run the security service;
a first storage unit configured to: in a process in which the TEE OS runs the security service, if the TEE OS crashes, store a hardware status parameter of the TEE, and
a restarting unit configured to restart the TEE OS, wherein
the second storage unit is configured to store a security context of the REE;
the REE OS is further configured to suspend calling of the security service;
the TEE OS is further configured to set, based on the stored hardware status parameter of the TEE, a hardware status parameter of the TEE obtained after the TEE OS is restarted;
the REE OS is further configured to set, based on the stored security context of the REE, a security context of the REE obtained after the TEE OS is restarted; the TEE OS is further configured to set, based on the stored security context of the REE, a context of the TEE obtained after the TEE OS is restarted; and
the REE OS is further configured to restore calling of the security service.

15. The computer system according to claim 14, wherein the REE OS is further configured to: after suspending calling of the security service, send, to an application corresponding to the security service, a notification indicating that the security service is unavailable.

16. The computer system according to claim 15, wherein
the REE OS is further configured to: after suspending calling of the security service, indicate the application corresponding to the security service to exit the security service; and the REE OS is further configured to: after restoring calling of the security service, indicate the application corresponding to the security service to restart the security service.

17. The computer system according to claim 14, wherein the REE OS is further configured to: after suspending calling of the security service, suspend receiving of a security service request sent by any application in the REE.

18. The computer system according to claim 14, wherein the security service comprises any one or more of a fingerprint matching service, a password verification service, and a face matching service.

19. The computer system according to claim 14, wherein the hardware status parameter of the TEE comprises data in a register in the TEE.

20. The computer system according to claim 14, wherein the security context of the REE comprises registration information of the security service.

\* \* \* \* \*